United States Patent

Ohtsuka et al.

Patent Number: 5,937,217
Date of Patent: *Aug. 10, 1999

[54] IMPRINTING APPARATUS FOR USE IN A CAMERA

[75] Inventors: Masanori Ohtsuka; Takanobu Tsunemiya, both of Yokohama; Minoru Tanabe; Koichi Matsumura, both of Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/008,321

[22] Filed: Jan. 25, 1993

[30] Foreign Application Priority Data

Jan. 31, 1992 [JP] Japan .................................. 4-040738

[51] Int. Cl.$^6$ .................................................. G03B 17/24
[52] U.S. Cl. ............................................ 396/310; 396/315
[58] Field of Search .................................. 354/105, 106; 396/310, 315–320

[56] References Cited

U.S. PATENT DOCUMENTS

| | | | |
|---|---|---|---|
| 4,989,025 | 1/1991 | Matsumura et al. | 354/106 |
| 5,040,006 | 8/1991 | Matsumura et al. | 354/106 |
| 5,103,250 | 4/1992 | Arifuku et al. | 354/106 |
| 5,155,513 | 10/1992 | Matsumura et al. | 354/106 |
| 5,302,990 | 4/1994 | Satoh et al. | 354/106 |
| 5,396,305 | 3/1995 | Egawa | 354/106 X |

FOREIGN PATENT DOCUMENTS 2127632  5/1990  Japan .

*Primary Examiner*—Howard B. Blankenship
*Attorney, Agent, or Firm*—Fitzpatrick, Cella, Harper & Scinto

[57] ABSTRACT

An imprinting apparatus for use in a camera having an imprinting device including a date information imprinting mode for imprinting date information, time information, or the like on a recording medium, and a message information imprinting mode for imprinting message information formed of alphanumeric characters, graphic designs or the like, or a message in the message information in one language being changed into a message in a different language if necessary, and an operating device for performing different operations on the imprinting device using the same operating member with respect to each of the date information imprinting mode and the message information imprinting mode.

40 Claims, 22 Drawing Sheets

FIG. 8

|   | ENGLISH | GERMAN | FRENCH | SPANISH |
|---|---|---|---|---|
| 1 | ♥I LOVE YOU♥ | ICH LIEBE DICH♥ | ♥JE TAIME♥ | ♥TE ♥AMO ♥ |
| 2 | THANK YOU ! | DANKE SCHÖN ! | MERCI ! | MUCHAS GRACIAS |
| 3 | SEASON'S GREETINGS | EIN FROHES FEST | MEILLEURS VOEUX | FELIZ NAVIDAD |
| 4 | HAPPY BIRTHDAY | ALLES GUTE ! | BON ANNIVERSAIRE | FELZ COMPLEAÑOS |
| 5 | CONGRATULATIONS | VIELE GRÜBE | BRAVO ! | FELICIDADES |

FIG. 9

|   | ENGLISH | GERMAN | FRENCH | SPANISH |
|---|---------|--------|--------|---------|
| 1 | E-1     | D-1    | F-1    | ES-1    |
| 2 | E-2     | D-2    | F-2    | ES-2    |
| 3 | E-3     | D-3    | F-3    | ES-3    |
| 4 | E-4     | D-4    | F-4    | ES-4    |
| 5 | E-5     | D-5    | F-5    | ES-5    |

FIG. 10

|   | ENGLISH | GERMAN | FRENCH | SPANISH |
|---|---------|--------|--------|---------|
| 1 | ENG-1   | DLD-1  | FRN-1  | ESP-1   |
| 2 | ENG-2   | DLD-2  | FRN-2  | ESP-2   |
| 3 | ENG-3   | DLD-3  | FRN-3  | ESP-3   |
| 4 | ENG-4   | DLD-4  | FRN-4  | ESP-4   |
| 5 | ENG-5   | DLD-5  | FRN-5  | ESP-5   |

FIG. 12

```
         CAPTION
E-1.  ♥ I LOVE YOU ♥
E-2.    THANK YOU
E-3.   SEASON'S GREETINGS
E-4.   HAPPY BIRTHDAY
E-5.   CONGRATULATIONS
E-6.   HAPPY NEW YEAR
```

```
         MESSAGE
F-1.  ♥ JE TAIME ♥
F-2.    MERCI !
F-3.   MEILLEURS VOEUX
F-4.   BON ANNIVERSAIRE
F-5.   BRAVO !
(F-6.  HAPPY NEW YEAR   )
```

```
        UBERSCHRIFT
D-1.   ICH LIEBE DICH ♥
D-2.   DANKE SCHÖN !
D-3.   EIN FROHES FEST
D-4.   ALLES GUTE !
D-5.   VIELE GRÜBE
(D-6.  HAPPY NEW YEAR   )
```

```
         MENSAJE
ES-1.  ♥ TE ♥ AMO ♥
ES-2.   MUCHAS GRACIAS
ES-3.   FELIZ NAVIDAD
ES-4.   FELIZ CUMPLEANOS
ES-5.   FELICDADES
(ES-6.  HAPPY NEW YEAR  )
```

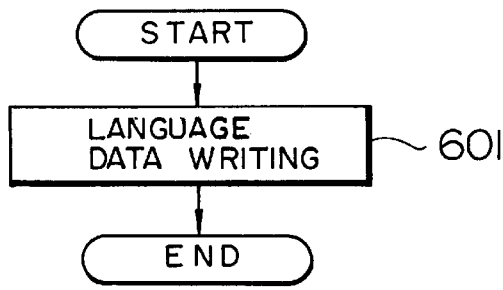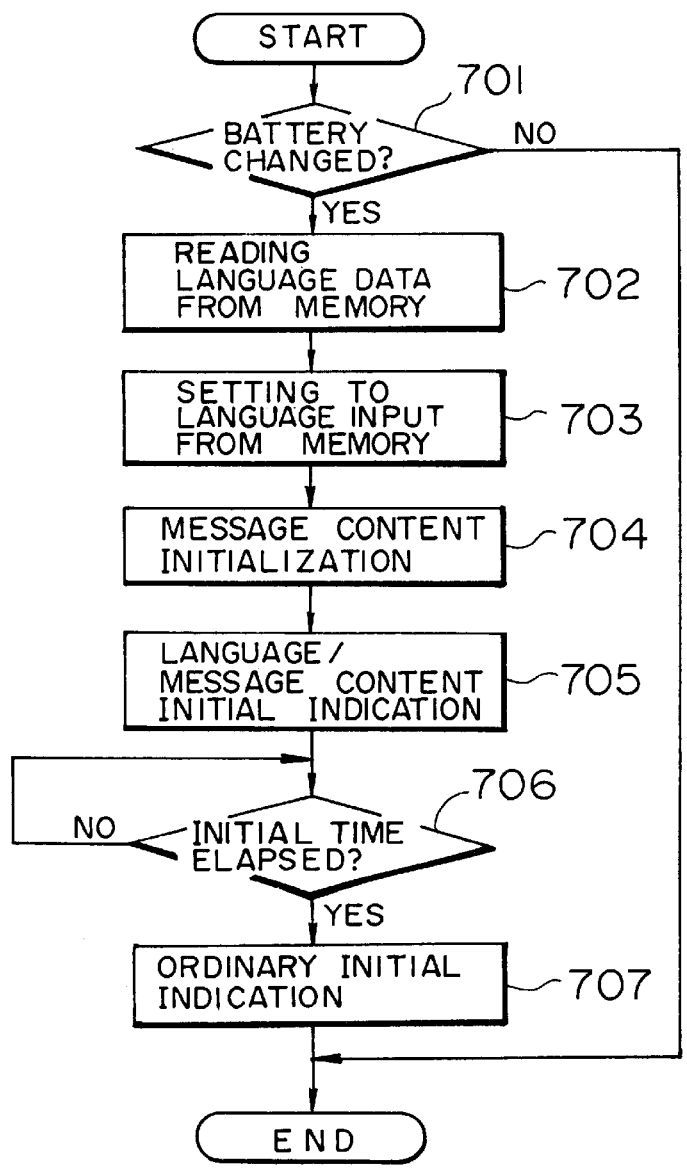

FIG.19

| CODES | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| CHARACTERS | A | B | C | D | E | F | G | H | I | J | K | L | M | N | O | P |

| CODES | 17 | 18 | 19 | 20 | 21 | 22 | 23 | 24 | 25 | 26 | 27 |
|---|---|---|---|---|---|---|---|---|---|---|---|
| CHARACTERS | Q | R | S | T | U | V | W | X | Y | Z | |

FIG.20

| IMPRINT CHARACTERS | | B | Y | | S | I | Z | U | O | K | A | | | |
|---|---|---|---|---|---|---|---|---|---|---|---|---|---|---|
| CHARACTER CODES | CONTROL CODE | 02 | 25 | 27 | 19 | 09 | 26 | 21 | 15 | 11 | 01 | 27 | 27 | 27 |

| IMPRINT CHARACTERS | | T | O | | K | A | Z | U | K | O | | | | |
|---|---|---|---|---|---|---|---|---|---|---|---|---|---|---|
| CHARACTER CODES | CONTROL CODE | 20 | 15 | 27 | 11 | 01 | 26 | 21 | 11 | 15 | 27 | 27 | 27 | 27 |

IMPRINTING APPARATUS FOR USE IN A CAMERA

BACKGROUND OF THE INVENTION

1. Field of the Invention

This invention relates to an imprinting apparatus which has an imprinting means for imprinting various kinds of information on a recording medium such as a film, and which is suitable for use in a camera.

2. Description of the Related Art

Various methods for imprinting date information or the like on a photograph are known. To record a child's growth or to rearrange file photographs, it is very convenient that the date and time when the photographs are taken are imprinted thereon.

A method for imprinting message characters or the like on a photograph, e.g., one disclosed in Japanese Patent Laid-Open Publication Hei 2-127632, is also known. This method can be used very conveniently because it makes it possible to imprint season's greetings or words expressing one's message, e.g., "HAPPY NEW YEAR" or "CONGRATULATIONS", in a photograph. A photographer can use this function by a simple operation of selecting one of several prepared messages.

An imprinting apparatus is also known which has an improved message function whereby a message according to a photographer's preference can be input and the message can be imprinted in accordance with the input data.

However, with the recent rapid internationalization, there are increased chances of going to many countries in the world, taking photographs of persons in each country and sending the persons their photographs, as well as photographing in one's own country and taking photographs of persons in the same country. Accordingly, need for imprinting messages in various languages has arisen.

Although the English-speaking population in the world is large, it is natural that a large number of people wish to imprint messages in other languages. However, no cameras satisfying such a need have been provided.

Also, one may wish to use words such as "MERCI" or "DANKE SCHON" instead of "THANK YOU" if he or she wants to express his or her gratitude in a witty manner.

There is also a problem relating to the use of an imprinting means. That is, a user cannot use an imprinting means when a need for using it occurs unexpectedly or the instruction book is lost, unless the user is already familiar with the function of the imprinting means so as to be able to input any character data. Even if the manual is found, it is not always possible to understand it well enough to utilize the function.

Further, even if the photographer had managed to input suitable characters, the data in a memory disappears and needs to be input again if the memory is reset by a battery change or the like.

Moreover, even if the photographer had managed to input and register suitable characters, it is very troublesome to search for a necessary message if there are many messages registered simultaneously.

SUMMARY OF THE INVENTION

An object of the present invention is to provide an imprinting apparatus for use in a camera capable of imprinting a message using letters or characters or a message in a desired language as well as date information by a comparatively simple operation without requiring many operating members.

To achieve this object, according to one aspect of the present invention, there is provided an imprinting apparatus comprising imprinting means having a date information imprinting mode for imprinting date and time information and the like on a recording medium, and a message information imprinting mode for imprinting message information formed of alphanumeric characters, graphic designs or the like, a message in the message information in one language being changed into a message in a different language if necessary, and operating means for performing different operations on the imprinting means using the same operating member with respect to each of the date information imprinting mode and the message information imprinting mode.

Another object of the present invention is to provide an imprinting apparatus being capable of eliminating a troublesome user operation for setting letters or characters in a desired language after a battery change, and optionally being capable of confirming the set letter/character information.

To achieve this object, according to another aspect of the present invention, there is provided an imprinting apparatus comprising imprinting means for imprinting message information formed of letter, characters or the like on a recording medium, and setting means for automatically setting predetermined message information after the completion of a battery change so that the predetermined message information is imprinted in a predetermined language by the imprinting means.

Still another object of the present invention is to provide an imprinting apparatus which enables a reduction in the area on a display means for displaying each of several kinds of information on imprinting, and which enables the display content to be visually confirmed at a glance.

To achieve this object, according to still another aspect of the present invention, there is provided an imprinting apparatus comprising imprinting means for imprinting message information formed of letter, characters or the like in different languages on a recording medium, and display means for indicating set language information by an abbreviation letter and for indicating printing information in the set language by a symbol. This display means includes a means for indicating letter/character imprinting information having the same meaning by the same symbol no matter what the set language. Language information, also referred to as "nationality information", and information on the kinds of letters/characters set by the display means are indicated by an abbreviation letter and a symbol, respectively.

A further object of the present invention is to provide an imprinting apparatus capable of reducing the possibility of either an error in setting letters/characters to be imprinted or a failure to set desired letters/characters, or both.

To achieve this object, according to a further aspect of the present invention, there is provided an imprinting apparatus comprising memory means capable of writing and reading information and capable of maintaining a memory content even at the time of a battery change, wherein message information formed of alphanumeric characters, graphic designs, or the like is written in the memory means, reading means for reading, by a predetermined timing, the message information previously written in said memory means, and imprinting means for imprinting, on a recording medium, the message information read out by the reading means.

Other aspects of the present invention will become apparent from the following description of the preferred embodiments of the present invention.

BRIEF DESCRIPTION OF THE DRAWINGS

FIG. 8 is a table showing the contents of messages in different languages in accordance with the first embodiment of the invention;

FIG. 9 is a table of displayed characters and symbols related to the messages in the different languages in accordance with the first embodiment of the invention;

FIG. 10 is another table of displayed characters and symbols related to the messages in the different languages;

FIG. 12 is a diagram of films on which the contents of messages in accordance with the first embodiment of the invention are written;

FIG. 14 is a flowchart of a data writing process of the camera having the imprinting apparatus in accordance with the second embodiment of the invention;

FIG. 15 is a flowchart of another process of the camera having the imprinting apparatus in accordance with the second embodiment of the invention at the time of a battery change;

FIG. 19 is a diagram of a relationship between letters/characters and codes in accordance with a third embodiment of the present invention;

FIG. 20 is a diagram of a relationship between data and codes stored in a memory means in accordance with the third embodiment of the invention;

DESCRIPTION OF THE PREFERRED EMBODIMENTS

Preferred embodiments of the present invention will be described with reference to the accompanying drawings.

Figure 1:
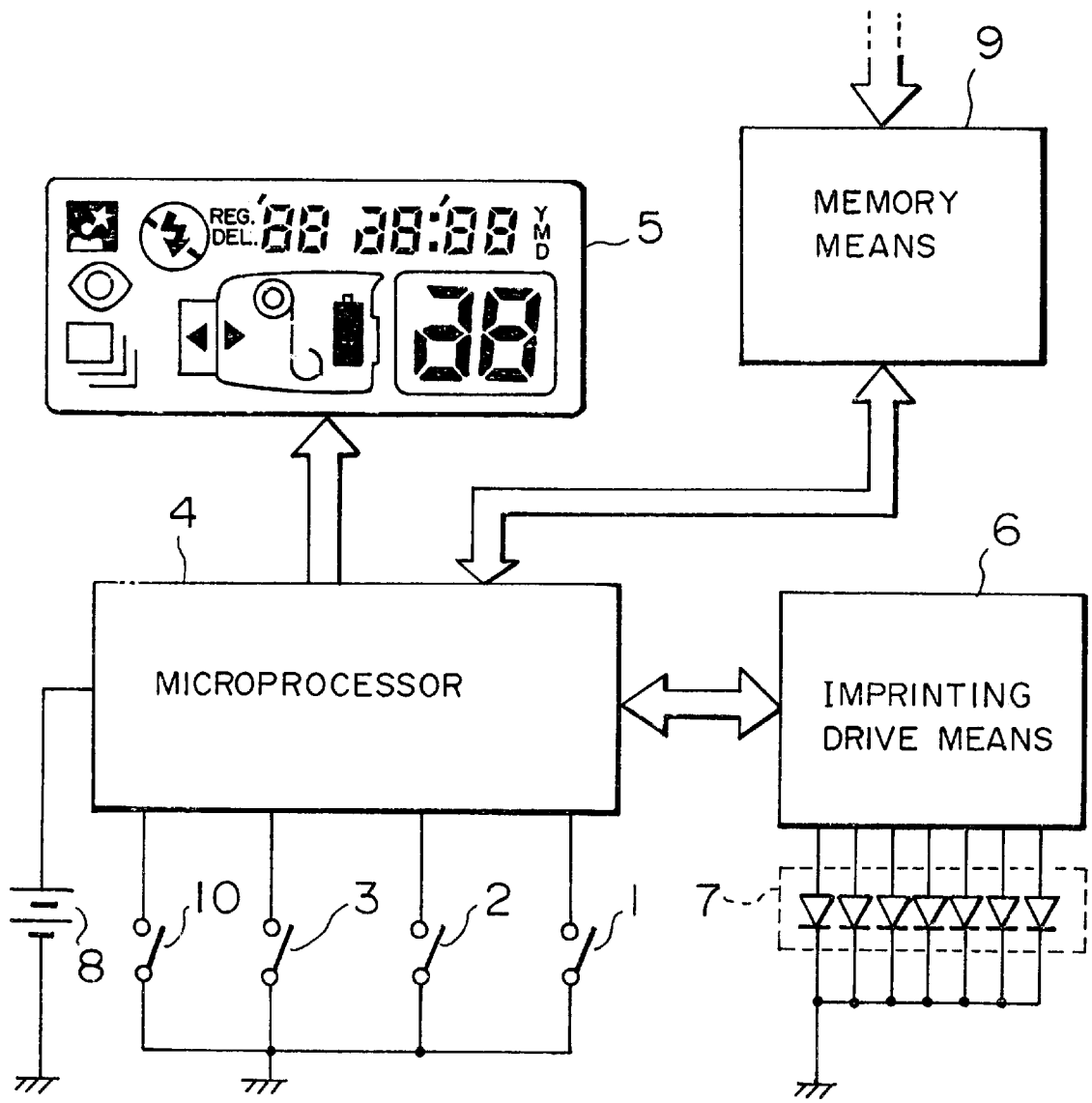
FIG. 1 is a schematic diagram of the construction of a camera having an imprinting apparatus in accordance with embodiments of the present invention.

FIG. 1 is a block diagram schematically showing a camera imprinting apparatus in accordance with the first embodiment of the present invention.

As shown in FIG. 1, the imprinting apparatus has a message switch 1 for changing a display/imprinting mode from an ordinary mode for displaying/imprinting a date and a time (hereinafter referred to as "date mode") to a mode for displaying/imprinting a message (hereinafter referred to as "message mode"), a date switch 2 for changing a mode from the message mode to the ordinary date mode and for changing the order of date contents in the date mode, and a selection switch 3 for selecting places of numbers when the date or time is corrected. A microprocessor 4 receives and recognizes information from these switches, controls the operation of the apparatus, and forms a display in accordance with the content of the information. Display means such as a liquid crystal display (LCD) 5 provides various kinds of indications. The display means 5 includes means for displaying a date and a message number in 7 segments and a means for indicating a registration and a removal of optional character data, as described later.

An imprinting drive means 6 receives imprinted font information from the microprocessor 4 and successively lights light emitting diodes (LED) 7 forming a 7-segment light source to imprint various kinds of data. A power source 8 for the imprinting apparatus is a detachable unit, e.g., a battery. A block 9 represents memory means for storing optional character data and control codes related to the optional character data. The memory means 9 is formed of an EEPROM, or the like, capable of maintaining data even when the battery is changed. Data can be read from or written to the memory means 9 by the microprocessor 4 and a special external tool, for example, an EEPROM programmer (not shown). A setting switch 10 for determining a request for correction of a date or time is also provided.

Figure 2:
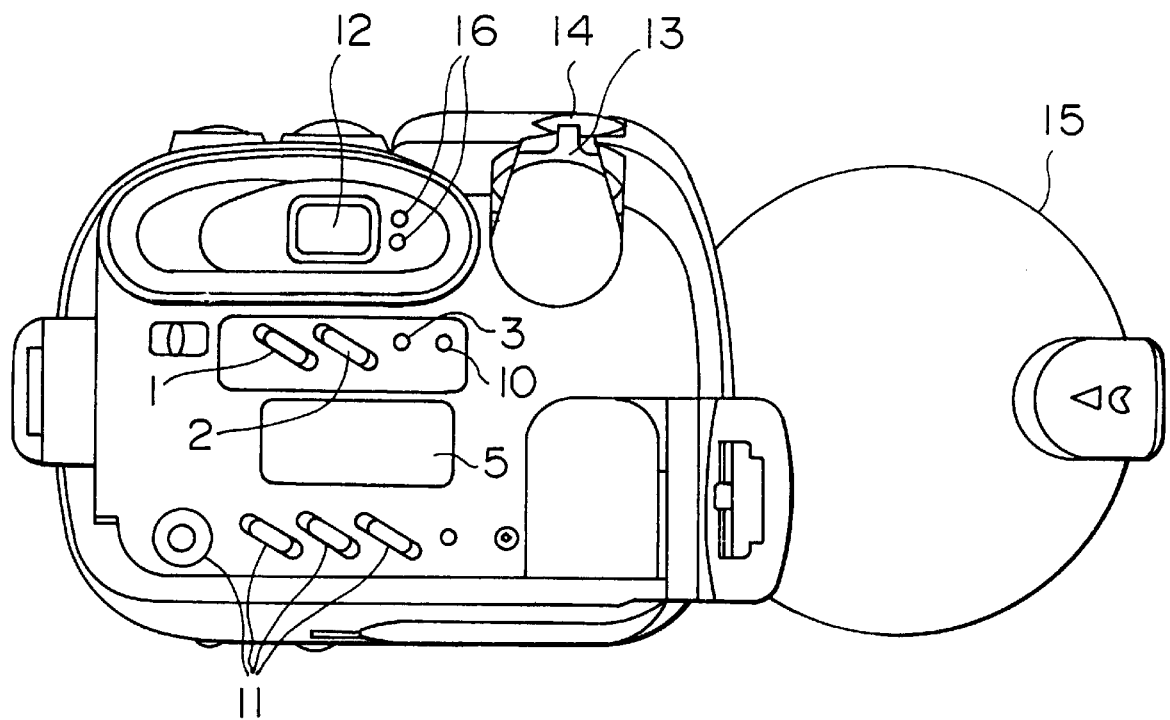
FIG. 2 is a rear view of the camera with the imprinting apparatus shown in FIG. 1.

FIG. 2 is a rear view of a camera provided with the above-described imprinting apparatus. Portions of this camera corresponding to those shown in FIG. 1 are indicated by the same reference characters.

The camera has mode switches 11 for setting camera modes, a finder 12, a zoom switch 13 for changing the focal length of a photographic lens, a release switch 14, a lens cover 15 having a main switch, and LEDs 16 for displaying camera operations.

The selection switch 3 and the setting switch 10 are designed so as to be smaller in size than the message switch 1 and the date switch 2 in order to reduce the possibility that they will be pressed inadvertently.

Figure 3:
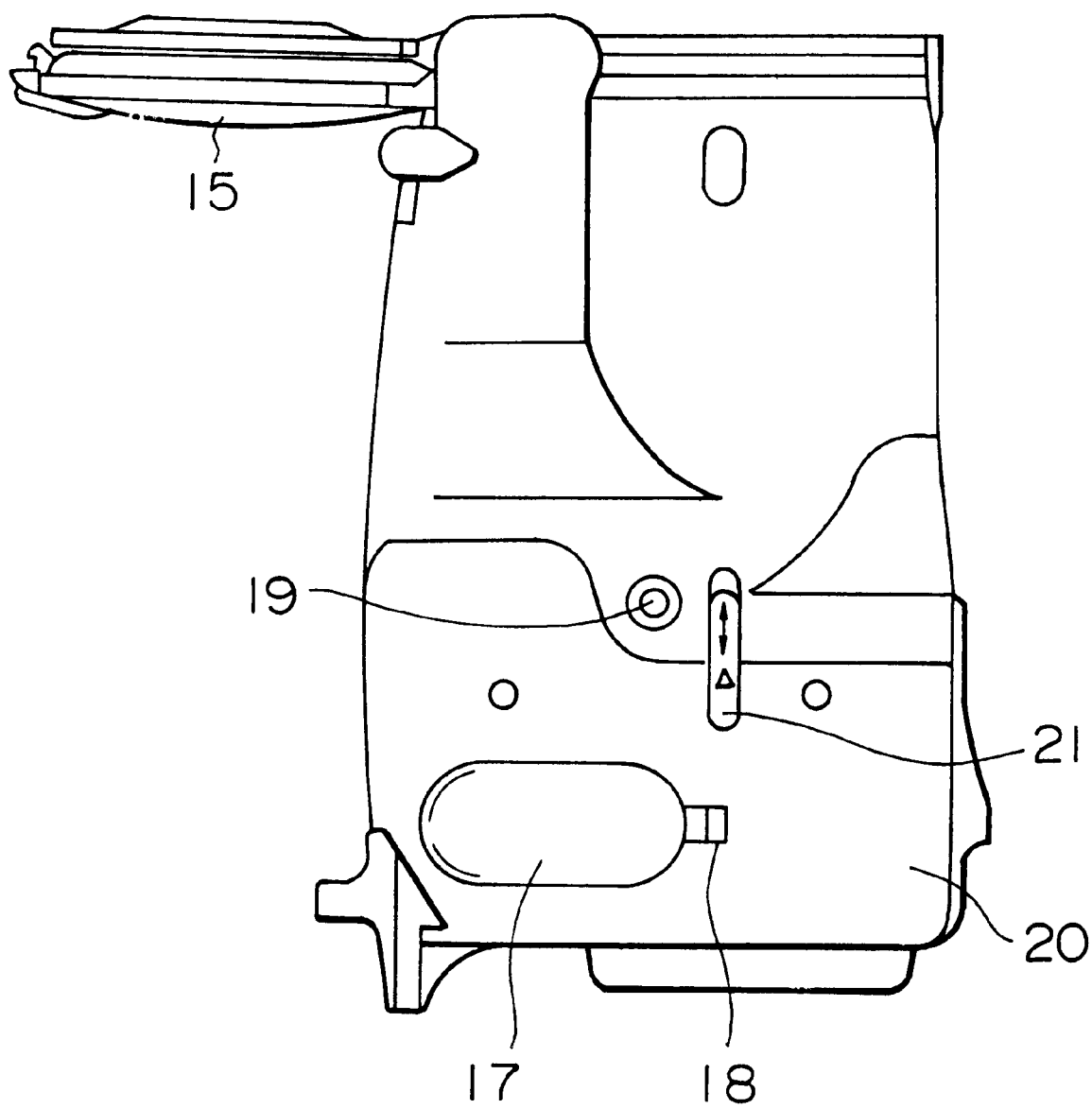
FIG. 3 is a bottom view of the camera having the FIG. 1 embodiment apparatus.

FIG. 3 is a bottom view of the camera having the above-described imprinting apparatus.

FIG. 3 illustrates a battery chamber cover 17, a battery chamber cover opening knob 18, a tripod screw hole 19, a bottom cover 20 and a bottom cover opening knob 21.

A battery is changed in such a manner that the battery chamber cover opening knob 18 is pressed to open the battery chamber 17, the old battery is extracted, a new battery is inserted, and the battery chamber cover 17 is closed.

Figure 4:
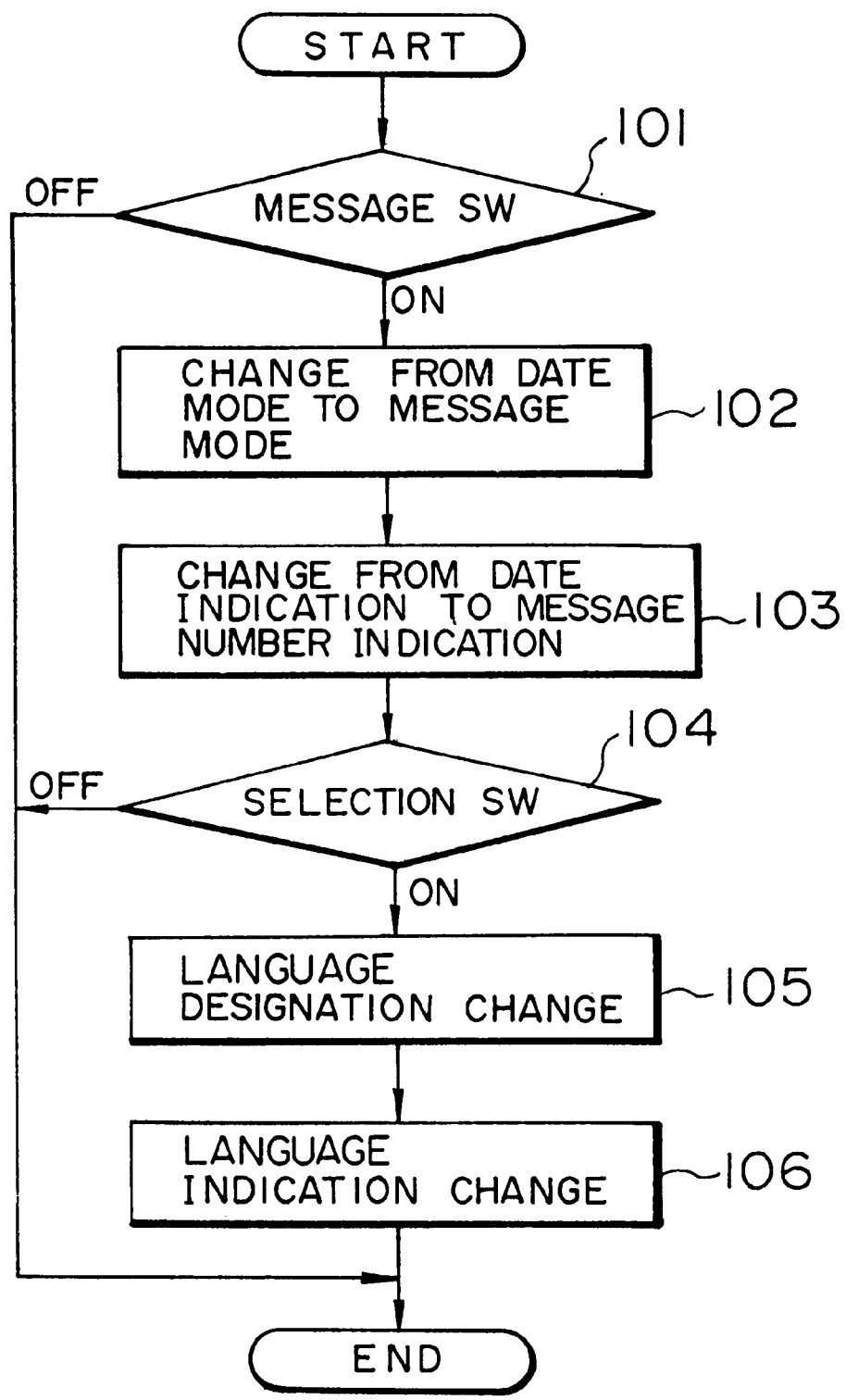
FIG. 4 is a flowchart of a process of the operation of the camera having an imprinting apparatus in accordance with a first embodiment of the present invention.

FIG. 4 is a flowchart of a process in which a language used in the message mode is changed.

First, in the date mode, a determination is made by the microprocessor 4 as to whether the message switch 1 is on (step 101). If the message switch 1 is on, the mode is changed from the date mode to the message mode (step 102), and the display is also changed from a date display to a message number display (step 103). A determination is then made as to whether the selection switch 3 is on (step 104). If the selection switch 3 is off, the process is immediately terminated. If the selection switch 3 is on, that is, if there is a need to change a language in the message mode, the designated language is changed to the next language in order (step 105). The display of the language is also changed (step 106).

Figure 5:
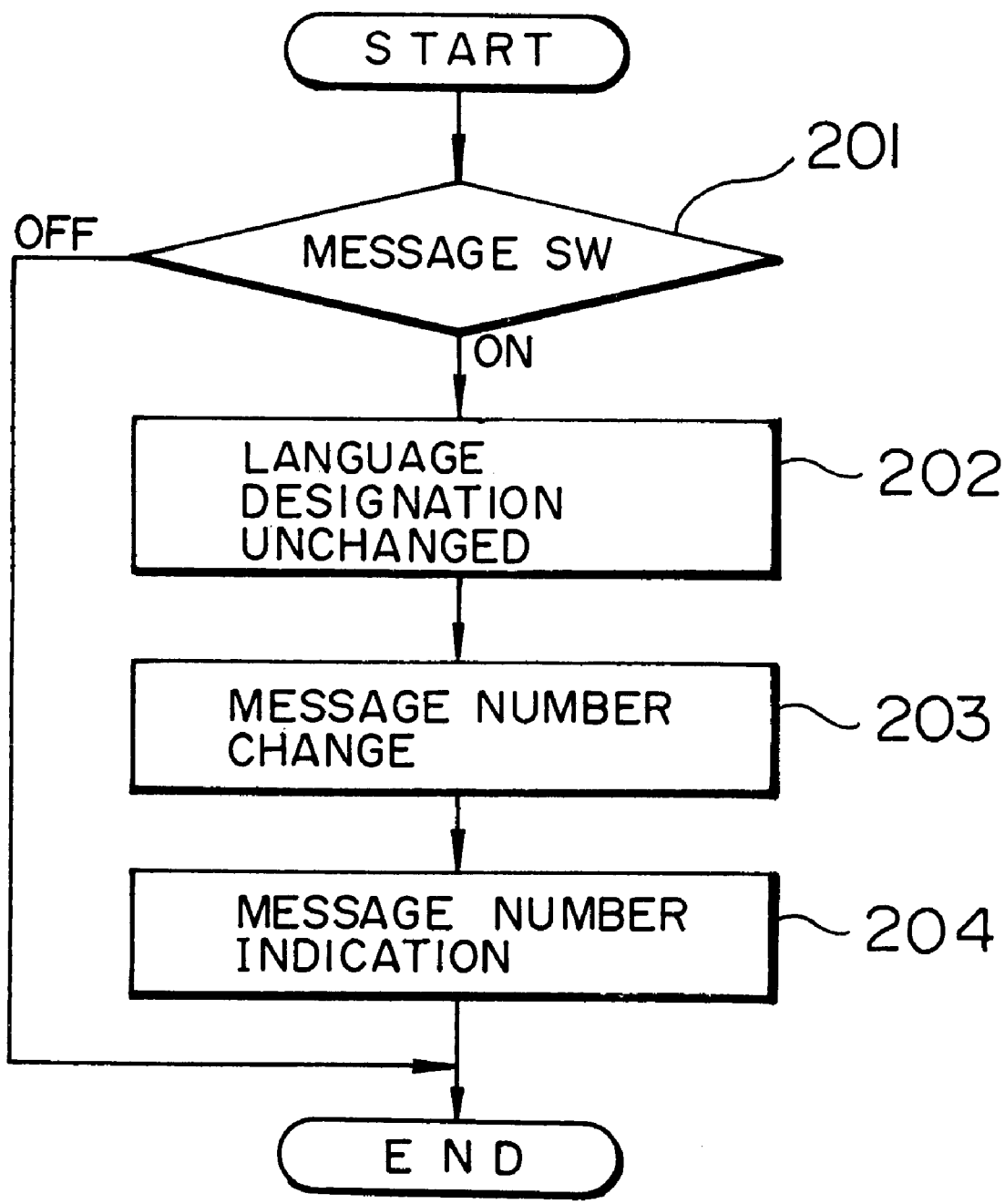
FIG. 5 is a flowchart of another operation of the camera having the imprinting apparatus.

FIG. 5 is a flowchart of a process in which the content of a message is changed without changing a designated language.

First, in the message mode, a determination is made by the microprocessor 4 as to whether the message switch 1 is on (step 201). If the message switch 1 is on, the designated language is not changed (step 202), but the content of a message is changed and a corresponding message number is also changed (step 203). The new message number thereby selected is then displayed (step 204).

Figure 6:
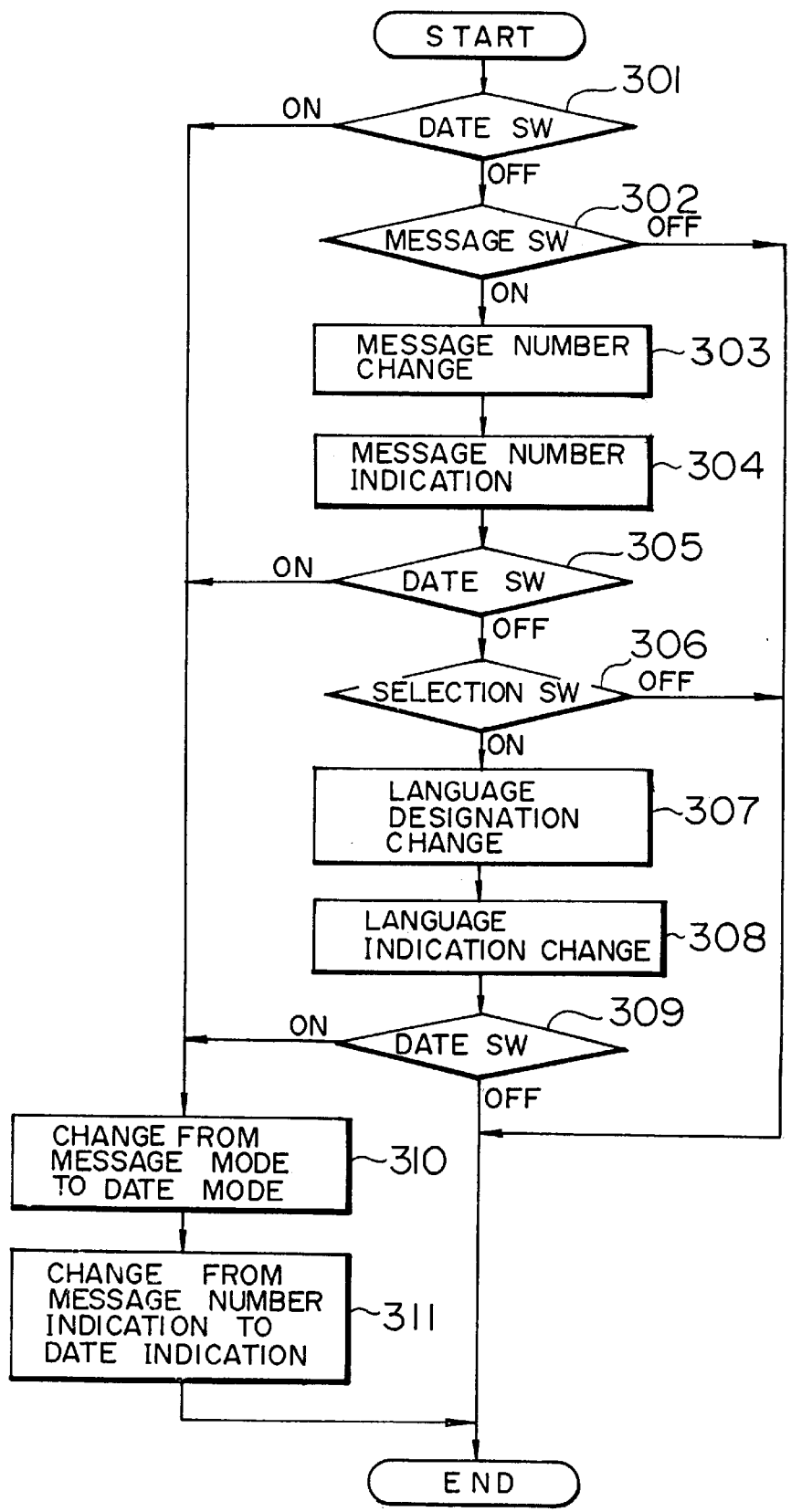
FIG. 6 is a flowchart of another process of the camera having the imprinting apparatus in accordance with the first embodiment of the invention.

FIG. 6 is a flowchart of a process relating to the ordinary date mode and the message mode.

First, in the message mode, a determination is made by the microprocessor 4 as to whether the date switch 2 is on (step 301). If the date switch 2 is on, the mode is changed from the message mode to the date mode (step 310) and the message number display is changed to the date display (step 311). If the date switch 2 is off (step 301), a determination is then made as to whether the message switch 1 is on. If the message switch 1 is off, the process is immediately terminated. If the message switch 1 is on (step 302), the content of a message is changed and the message number is also changed (step 303). The changed message number is then displayed (step 304).

Next, a determination is made as to whether the date switch 2 is on (step 305). If the date switch 2 is on, the mode is changed from the message mode to the date mode (step 310) and the message number display is changed to the date indication (step 311). If the date switch 2 is off (step 305), a determination is then made as to whether the selection switch 3 is on (step 306). If the selection switch 3 is off, the process is immediately terminated. If the selection switch 3 is on (step 306), a designated language is changed (step 307), and the changed language is then displayed (step 308). A determination is made again as to whether the date switch 2 is on (step 309). If the date switch 2 is on, the mode is changed from the message mode to the date mode (step 310) and the message number display is changed to the date display (step 311). If the date switch 2 is off, the process is immediately terminated.

Figure 7:
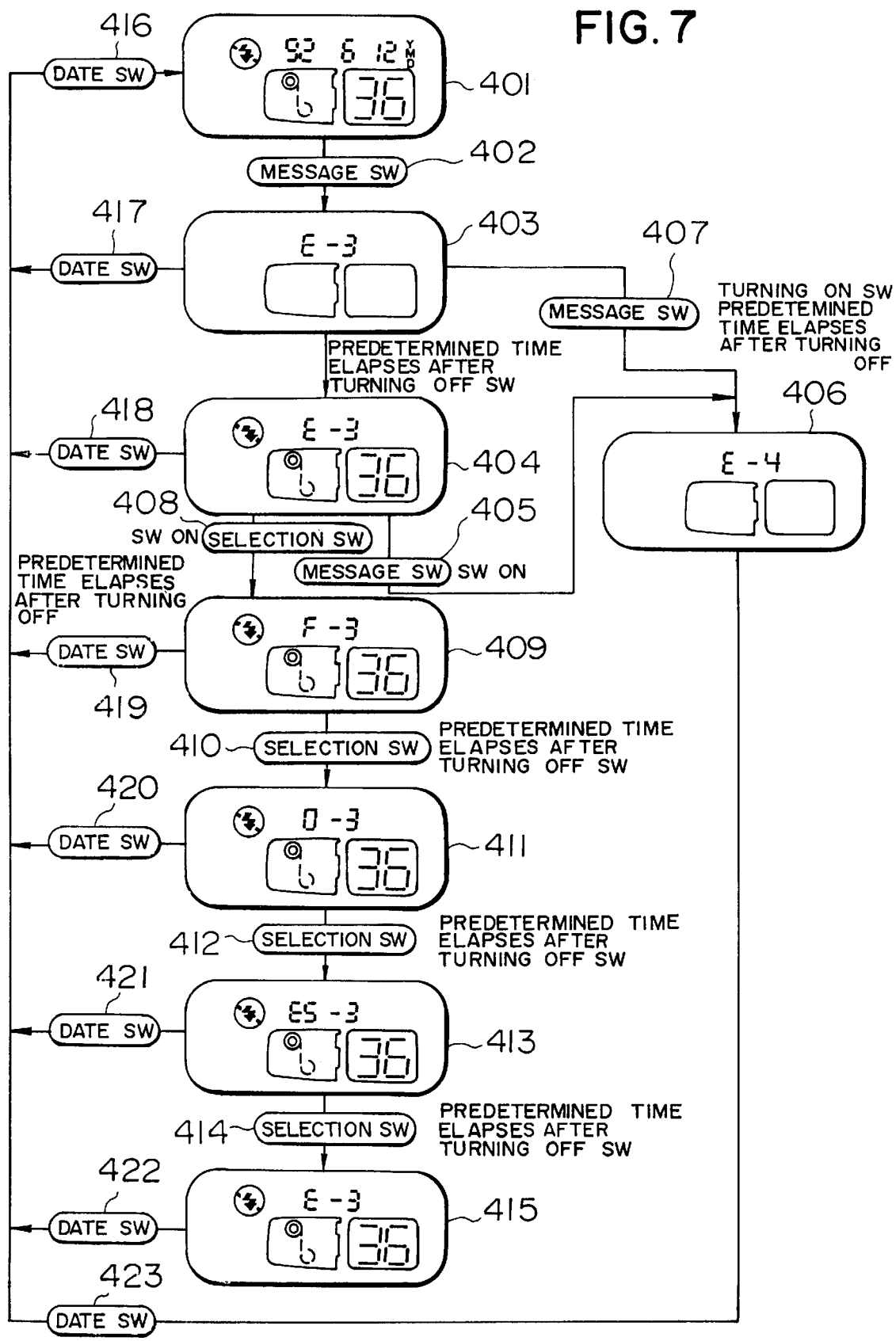
FIG. 7 is a diagram of changes in the display state and the switch operating state and the like in accordance with the first embodiment of the invention.

FIG. 7 is a diagram showing changes in the state of the display, i.e., the content of the processes shown in FIGS. 4 through 6.

It is assumed that, in step 401, a film has been set with the date "Jun. 12, 1992", the number of film frames on the film is "36" and use of electronic flash is inhibited, as illustrated.

If in the date mode the message switch 1 is turned on (step 402), the mode is changed to the message mode and only the previously stored message number and nationality are displayed (step 403). In this example, it is assumed that English language message 3 (symbolized by "E-3") is indicated. After a predetermined time elapse from this operation, displays of information other than "E-3" are activated (step 404). If, in this state, the message switch 1 is turned on (step 405), only the message number is changed without changing the language display, and "E-4" is thereby displayed (step 406). Also, if the message switch 1 is pressed before the predetermined time elapses after the operation of turning on the message switch 1 (step 407), "E-4" is also displayed. If the selection switch 3 is pressed in the state of step 404 (step 408), the language designation is changed and the language is changed from English to French (symbolized by F) (step 409), while the message number "3" is not changed. "F-3" is thereby displayed. If the selection switch 3 is pressed again (step 410), the language is changed from French to German (symbolized by D), and "D-3" is displayed (step 411). Similarly, if the selection switch 3 is pressed again (step 412), the language is changed from German to Spanish and "ES-3" is displayed (step 413). If the selection switch 3 is further pressed again (step 414), the language is changed from Spanish back to English and "E-3" is displayed (step 415). This operation is repeated.

In any of the states "E-3" (step 403), "E-4" (step 406), "F-3" (step 409), "D-3" (step 411), "ES-3" (step 403) and "E-3" (step 415), if the date switch 2 is pressed (step 417, 418, 419, 420, 421, 422, or 423), the message mode is changed to the ordinary date mode and "'92. 6. 12" is displayed.

FIG. 8 shows examples of messages in each of these languages.

In this embodiment, each of five kinds of messages can be used in each of four languages, i.e., English, German, French and Spanish.

As shown in FIG. 8, the words corresponding to "WATASHI WA ANATA GA SUKI DESU" in Japanese, i.e., "I LOVE YOU" in English, "ICH LIEBE DICH" in German, "JE T'AIME" in French, and "TE AMO" in Spanish are prepared as message 1. Also, the words corresponding to "DŌMO ARIGATŌ" in Japanese, i.e., "THANK YOU" in English and other corresponding words in German, French and Spanish are prepared as message 2.

Similarly, the words corresponding to "GOKIGEN IKAGA DESUKA" in Japanese ("season's greetings") are prepared as message 3, words corresponding to "OTAN-JOBI OMEDETŌ" in Japanese are prepared as message 4, and words corresponding to "OMEDETO" in Japanese are prepared as message 5. These words are arranged so as to be selected in the above-described order.

Thus, if a table is prepared in which messages in languages one of which a user knows are numbered, the user can understand messages in other languages from the relationship between the words and the corresponding message members.

Five kinds of messages have been selected as shown in FIG. 8 for convenience, but the number of kinds of messages used in accordance with the present invention is not particularly limited. Also, messages in four languages each designated with the corresponding language have been selected, but they are not exclusive or limited in number.

FIG. 9 shows a display manner of the contents of the above-described messages and languages on the display means 5.

The display manner has been partially described above with reference to the display state change diagram of FIG. 7 but will be described below in its entirety.

Language information designating four languages, i.e., English, German, French and Spanish, and five kinds of message contents are provided.

Each of the messages for the English-speaking world is symbolized by "E", i.e., the first letter of "ENGLISH" and a message number suffix. If "E-1" is displayed by the display means 5, a message "♡ I LOVE YOU ♡" is imprinted on the film. In the case of "E-2","THANK YOU !" is imprinted. Similarly, in the case of "E-3", the season's greetings are imprinted. In the case of "E-4", "HAPPY BIRTHDAY" is imprinted. In the case of "E-5", "CONGRATULATIONS" is imprinted.

Each of the messages for the German-speaking world is symbolized by "D", i.e., the first letter of Deutsch and a message number suffix. French messages are symbolized by "F" and Spanish messages are symbolized by "ES". Message numbers are attached in the same manner as English messages in accordance with the relationship shown in FIG. 8.

The use of these symbols is advantageous because the symbols can be displayed by adding only a few segments to a 7 segment LCD unit for the date information, and there is no need to use a special display unit.

FIG. 10 shows another example of the symbolization expressing messages by three characters representing the languages, as in the case of the symbolization shown in FIG. 9.

In this case as well, the date information display unit formed of an alphanumeric LCD can be used and no special message display unit is required. Also, the display can be adapted to various languages.

Figure 11:
FIG. 11 is a diagram of a battery cover on which the contents of messages in accordance with the first embodiment of the invention are written.

FIG. 11 shows an example of a detachable mechanical member on which the contents of messages are written. In this example, the detachable member corresponds to the battery cover 17 shown in FIG. 3.

As shown in FIG. 11, the messages for the English-speaking world are written on the detachable member, as follows:

E-1: ♡ I LOVE YOU ♡
E-2: THANK YOU
E-3: SEASON'S GREETINGS
E-4: HAPPY BIRTHDAY
E-5: CONGRATULATIONS
E-6: HAPPY NEW YEAR

Thus, the message numbers (message languages) and the message contents can be understood at a glance.

Since this mechanical member (battery cover 17) is detachable, a user who wants to use the messages for the French-speaking world may detach the present member to replace the same with a French message member, and a user who wants to use the messages for the German-speaking world may replace the present member with a German message member.

The detachable mechanical member is not limited to the battery cover. For example, in the case of a camera with a hand strap or the like, the contents of messages may be written on the hand strap and may be changed according to the intended purpose. In the case of a camera with a lens cap, the contents of messages may be written on a reverse surface of the lens cap and may be changed according to the intended purpose by changing the lens cap.

Also, films, for example, adhesive labels, may be prepared with respect to different languages and each of them may be attached to the battery cover according to the intended purpose. The same advantages can be thereby achieved.

In the first embodiment, messages in different languages can be used with substantially the same facility as the operability of the conventional message mode to send messages on photographs to persons in various countries under various circumstances. The present invention is therefore adaptable for use in internationalized societies and contributes to enlargement of photography fields. The present invention is thus advantageous.

Also, in the first embodiment, the operational mode can be easily changed from any message mode to the initial date mode merely by pressing the date switch to inhibit imprinting in the message mode. Thus, the imprinting apparatus is easy to use.

Further, the contents of messages (letters, characters) are represented by message numbers (symbols) and corresponding language information is represented by an abbreviation. The necessary size of the display unit can be thereby reduced, while the ease with which the contents of messages and the languages are understood is improved.

Further, in the first embodiment, messages in different languages are arranged by being numbered to form a table such that the messages of the same message number have generally the same meaning. However, a table in which messages in one representative, e.g. one's native language are numbered may be prepared and set on the camera without using the table containing the messages in all the available languages. The contents of messages in the other languages can be roughly understood from this small table. If the contents of messages in each language are written on a detachable member of the camera, it is possible to adapt the printing apparatus to use messages in various languages only by interchanging, for example, the battery cover. This message table is thus convenient.

An imprinting apparatus in accordance with the second embodiment of the present invention will be described below. This embodiment of the imprinting apparatus relates to the effect of the imprinting apparatus at the time of a battery change in accordance with the first embodiment.

The construction of a camera in accordance with this embodiment is the same as that shown in FIGS. 1 through 3.

Figure 13:
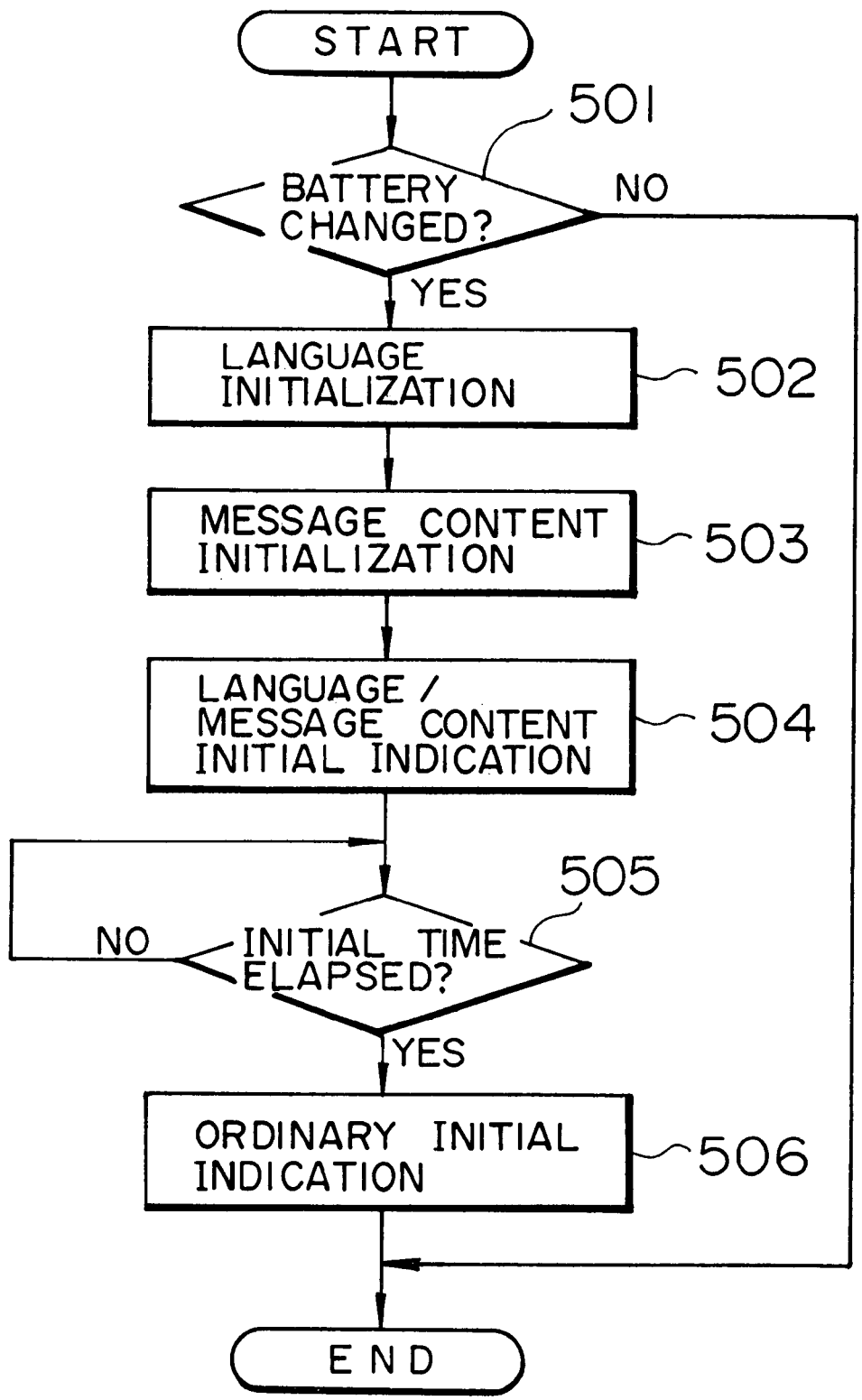
FIG. 13 is a flowchart of a process of a camera having an imprinting apparatus in accordance with a second embodiment of the present invention at the time of a battery change.

FIG. 13 is a flowchart of a process of setting the message mode for a predetermined language at the time of a battery change.

First, a determination is made as to whether the battery is changed (#501). If the battery is changed, an initialization circuit (not shown) in the microprocessor 4 is activated to read out language data previously stored in an internal non-volatile memory, such as a ROM, of the microprocessor 4 and to designate a message language (#502). Thereafter, data on the content of the message also stored previously in an internal non-volatile memory, such as a ROM, is read out and the message content is designated (#503). Then, characters representing the language and the message content are displayed on the display means 5 (#504). After a predetermined time elapse (#505), the display is restored to an ordinary initial indication (#506).

As described above, a code related to a language is previously written in a non-volatile memory, such as a ROM, in which various kinds of information for initialization are written, and imprinting apparatuses each having such setting are set for a particular language. For example, a code designating German is written in the imprinting apparatus for the German-speaking world, and a code designating French is written in the imprinting apparatus intended for the French-speaking world.

FIG. 14 is a flowchart of a process of writing a language designation in programmable memory of such as an EEPROM, by a special tool, for example, an external EEPROM programmer (not shown), before shipping.

As shown in FIG. 14, a code for a language to be set by initialization at the time of a battery change is written by the special tool connected to the memory means 9 (#601).

This writing may be performed before forwarding from a factory or before the camera is sold. It may also be performed at service stations.

A process of initialization setting a message language actually using this memory means at the time of changing a battery will be described below with reference to FIG. 15.

First, a determination is made as to whether or not the battery is changed (#701). If the battery is changed, an initialization circuit (not shown) in the microprocessor 4 is activated to read out language data stored in the memory means 9 (#702) and a message language is designated (#703). Thereafter, message content data also stored in the memory means 9 is read out and a message content is designated (#704). Then, characters representing the language and the message content are displayed on the display means 5 (#705). After a predetermined time elapse (#706), the display is restored to the ordinary initial indication (#707).

Thus, there is no need to prepare special imprinting apparatuses for respective languages and to classify them, and one imprinting apparatus can be adapted for use of messages of each language merely by rewriting the content of the memory means 9.

Figure 16:
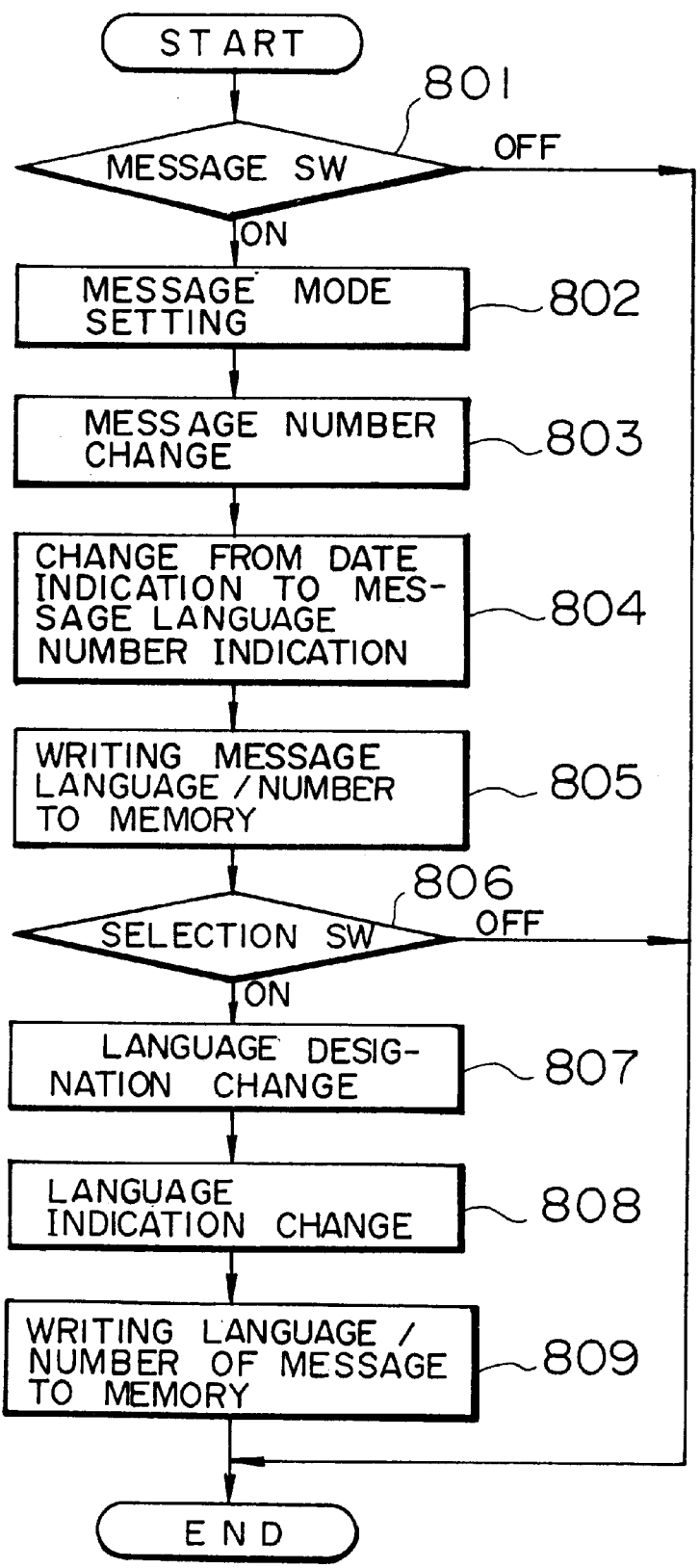
FIG. 16 is a flowchart of a message number changing process of the camera having the imprinting apparatus in accordance with the second embodiment of the invention.

FIG. 16 is a flowchart of a process of writing the content of a message and a language in the memory means 9 each time the imprinting apparatus is operated in the message mode.

It is assumed here that the message is changed by the operation of pressing the message switch 1 one time, and that the language data item is changed each time that the selection switch 3 is pressed in the message mode.

First, a determination is made as to whether the message switch 1 has been turned on by being pressed (#801). If the message switch 1 is on, a setting mode is changed from the ordinary date mode to the message mode (#802), and the number designating the message content is changed to select the next message (#803) and the display means 5 is changed from a state of indicating a date to a state of indicating a language and the selected message number (#804) and the code of the language and the message number is sent to and written in the memory means 9 (#805). If the message switch 1 is off (#801), the process is immediately terminated.

In step 806, a determination is made as to whether the selection switch 3 has been turned on by being pressed. If the selection switch 3 is on, only the message language designation is changed (#807), the language indication on the display means 5 is changed (#808), and the code of the changed language and the number of the selected message is sent to and written in the memory means 9 (#809). If the selection switch 3 is off, the process is immediately terminated.

Figure 17:
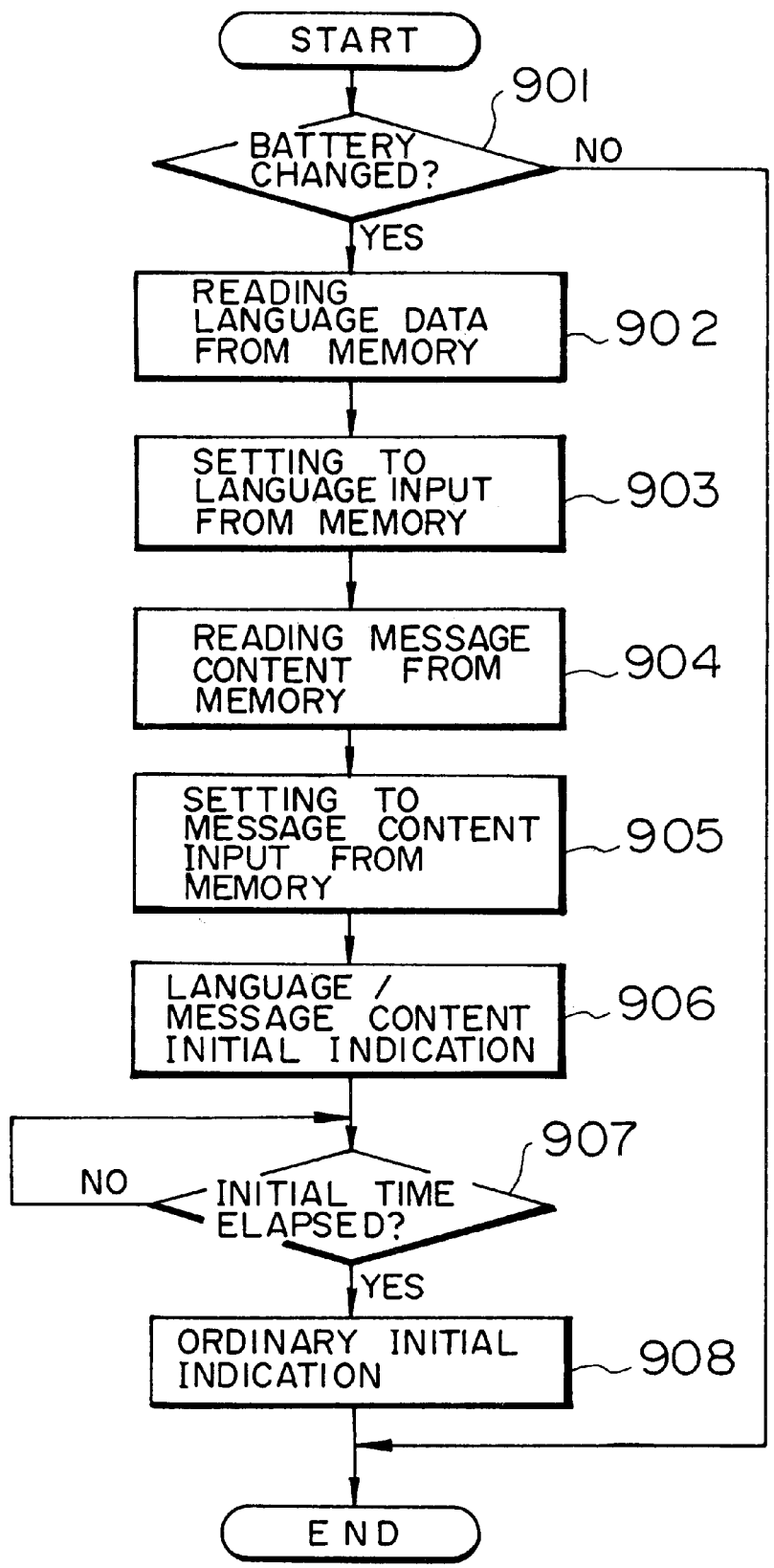
FIG. 17 is a flowchart of another process of the camera having the imprinting apparatus in accordance with the second embodiment of the invention at the time of a battery change.

FIG. 17 is a flowchart of a process of the initialization of the message language when a battery is actually changed in the same arrangement as that using the process shown in FIG. 16.

First, a determination is made as to whether or not the battery is changed (#901). If the battery is changed, an initialization circuit (not shown) in the microprocessor 4 is activated to read out language data stored in the memory means 9 (#902) and a message language is designated (#903). Thereafter, message content data also stored in the memory means 9 is read out (#904) and a message content is designated (#905). Then, characters representing the language and the message content are displayed on the display means 5 (#906). After a predetermined time elapse (#907), the display is restored to the ordinary initial indication (#908).

The processes shown in FIGS. 16 and 17 ensures that a person using the camera having the imprinting apparatus in accordance with this embodiment can use, after a battery change, messages in accordance with the language and the message content set before the battery change. Thus, the imprinting apparatus of the present invention can be used conveniently.

Figure 18:
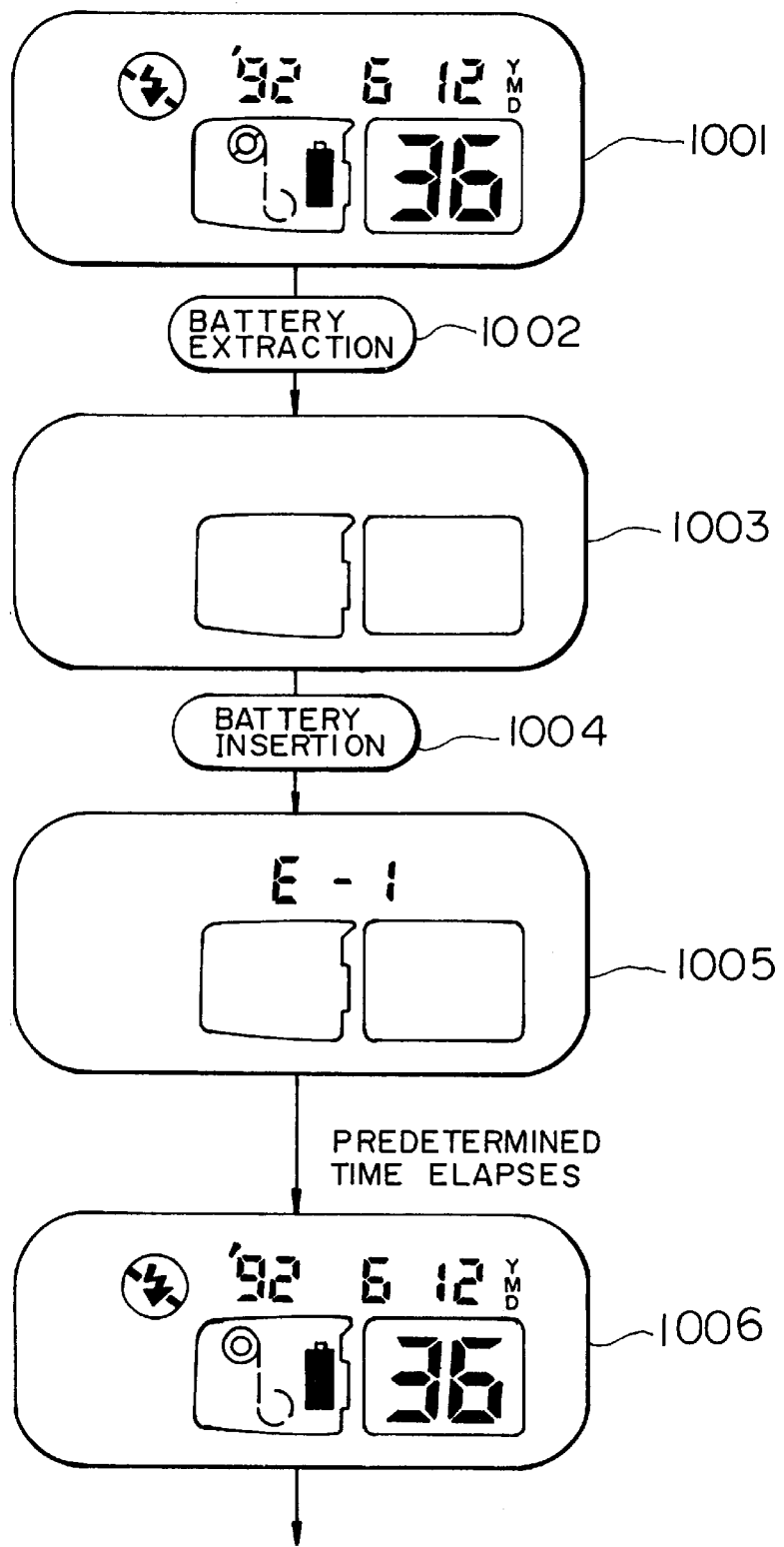
FIG. 18 is a diagram of a display state of the camera having the imprinting apparatus in accordance with the second embodiment of the invention at the time of a battery change.

FIG. 18 is a diagram showing changes in the display state when the battery is actually changed.

It is assumed that, in step 1001, for example, the date is "Jun. 12, 1992", the number of frames on the film is "36" and an electronic flash mode is such that use of an electronic flash is inhibited, as illustrated. If the battery is extracted and removed in this state (#1002), the display of the display means 5 is disabled and the display means is turned off (#1003) because the power supply for the display means 5 is stopped. When a new battery is inserted (#1004), the language and the content of a message are designated by the same method and operation as those described above with reference to FIGS. 13 through 17, and are indicated by the display means 5 (#1005). It is assumed here that English and the message content of message number 1 are initially set. The corresponding symbol displayed on the display means 5 is "E-1". After a predetermined time elapses, the display is reset from the message language/number display to the ordinary initial setting display (#1006). In this case, since before the battery change, the date is "Jun. 12, 1992", the number of frames on the film is "36" and the electronic flash mode is such that use of electronic flash is inhibited, a display state such as that in step 1006 is exhibited after a battery change. That is, the same display as that existing before the extraction of a battery is also effected after the battery change.

In accordance with the second embodiment, a language code corresponding to a country in which the camera is to be sold is set (at a service station or the like) to be used at time of a battery change. The need for, for example, a German to correct the setting from English to German each time the battery is changed is thereby eliminated and the imprinting apparatus is thereby made easier to use.

Such a code may be written in a programmable/erasable memory means to realize this function. That is, the desired effect can be achieved by simply writing a language designation code in the memory means of a particular imprinting apparatus with a special writing the necessity of manufacturing different imprinting apparatuses for each different country in which the camera will be sold.

Further, the imprinting apparatus may be arranged so that the language code and the message content last set before a camera battery change are written in a memory or the like. It is thereby possible to immediately use, after the battery change, messages in the corresponding language, which have been used before the battery change.

The third embodiment of the present invention will be described below. The construction of a camera in accordance with this embodiment is the same as that shown in FIGS. 1 through 3.

FIG. 19 is a table of an optional character font and codes related to font characters.

In a case where a user named "SIZUOKA" wishes to imprint "BY SIZUOKA" based on the data as shown in FIG. 20, corresponding character codes are [02, 25, 27, 19, 09, 26, 21, 15, 11, 01], a control code and a blank code are added to these codes to form a code array [(control code), 02, 25, 27, 19, 09, 26, 21, 15, 11, 01, 27, 27, 27, 27], and this code data is written in the memory means 9. Similarly, if the photograph is to be sent to a user having a name "KAZUKO", "TO KAZUKO" may be imprinted by writing [(control code), 20, 15, 27, 11, 01, 26, 21, 11, 15, 27, 27, 27, 27, 27].

In FIG. 19, the font data designates only alphabetic characters in the English language. However, the present invention is not limited to this. For example, fonts and codes for German, French, Russian and the like may be prepared to form messages of optical characters in each language. Also, a font of musical notes and other figures may be prepared to obtain a photograph suitably producing, for example, an original atmosphere, a comical character or an interesting graphic pleasing to children.

Any control code can be used so long as it conforms to font data. For example, the ASCII code or the JIS code may be used.

In the example shown in FIG. 20, the number of optional characters is limited to 13. Needless to say, the present invention is not limited to this. 16 characters, 20 characters, and so on can be used by increasing the memory capacity for optional characters. Further, the number of registered groups of optional characters is not limited to two as in the example shown in FIG. 20, and may be set to a greater number.

A data input process of the imprinting apparatus thus arranged to enable use of optional characters will be described below with reference to the flowchart of FIG. 21.

Various fixed characters are written with a special tool before the camera is shipped, or a user determines letters and characters that the user wants to imprint and takes the camera to a factory or a service department to write various data with a special tool. That is, a control code and optional character data is written by a method such as that described above with reference to FIG. 19, and the memory means 9 stores the code and data (step 1101).

When the imprinting apparatus having the memory means 9 in which the above-described various optional character data is stored is supplied with power, that is, when a battery is set in the camera having the optional character adaptable imprinting apparatus (step 1102), a reset code sent from an unillustrated camera microprocessor to perform power-on resetting is received (step 1103), the microprocessor 4 of the imprinting apparatus thereby performs the initialization operation. First, an optional character data control code is read from the memory means 9 (step 1104), optional character data is successively read (step 1105), and a determination is made as to whether regular optional character data has been received (step 1106). The use of ordinary data reception confirmation techniques will suffice for this step. For example, the confirmation may be performed in such a manner that if a signal conforming to a cipher of optional character codes is input, it is recognized as an optional character input, or a simple data bit sum checking may suffice. It is assumed that the reception conformation is performed by sum checking in this embodiment.

Next, a determination is made as to whether the result of sum checking indicates a regular optional character input (step 1107). If YES, the content of the imprinting control code received in step 1104 is then checked (step 1108). If an optional character imprinting flag therein is "1", use of this imprinting data is determined and the read character data read in step 1105 is stored in an internal RAM of the microprocessor 4 (step 1109). The microprocessor 4 sets a mode such that optional character imprinting is possible (step 1110), displays a message number of the optional characters, which may be included in the imprinting control code or previously determined by the order in which the optional character data is stored (step 1111), and, after a predetermined time elapse (step 1115), restores the display to the ordinary initial indication (step 1116).

If the result of sum checking in step 1107 indicates non-coincidence, or if the optional character imprinting flag is "0" in step 1108, the optional character data read in step 1105 is reset (step 1112), the setting of the optional character imprinting enable mode is inhibited (step 1113) and the ordinary imprinting mode is indicated (step 1114). After a predetermined time elapse (step 1115), the display is restored to the ordinary initial setting indication (step 1116).

Figure 21:
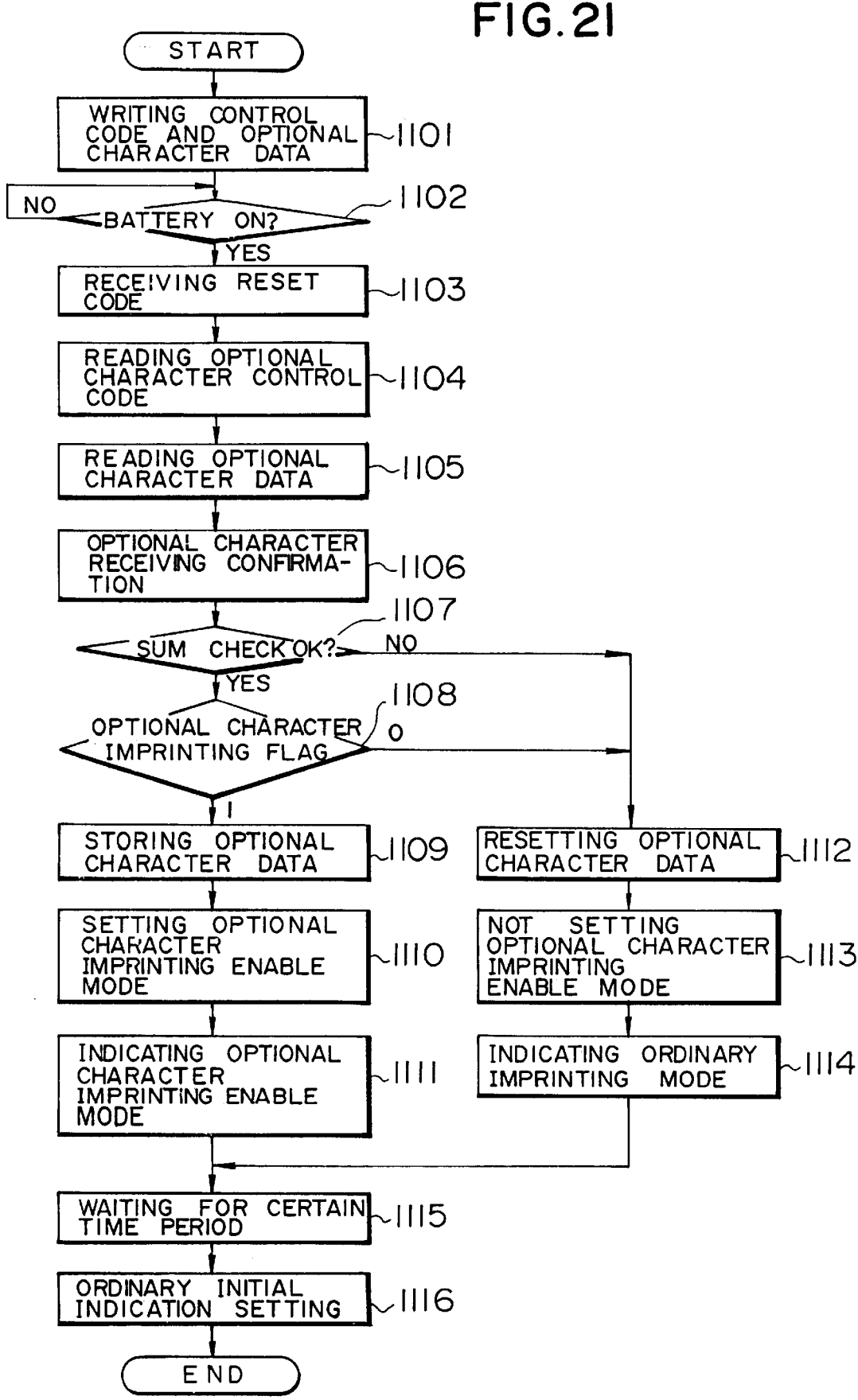
FIG. 21 is a flowchart of the operation of the camera having the imprinting apparatus in accordance with the third embodiment of the invention.
Figure 22:
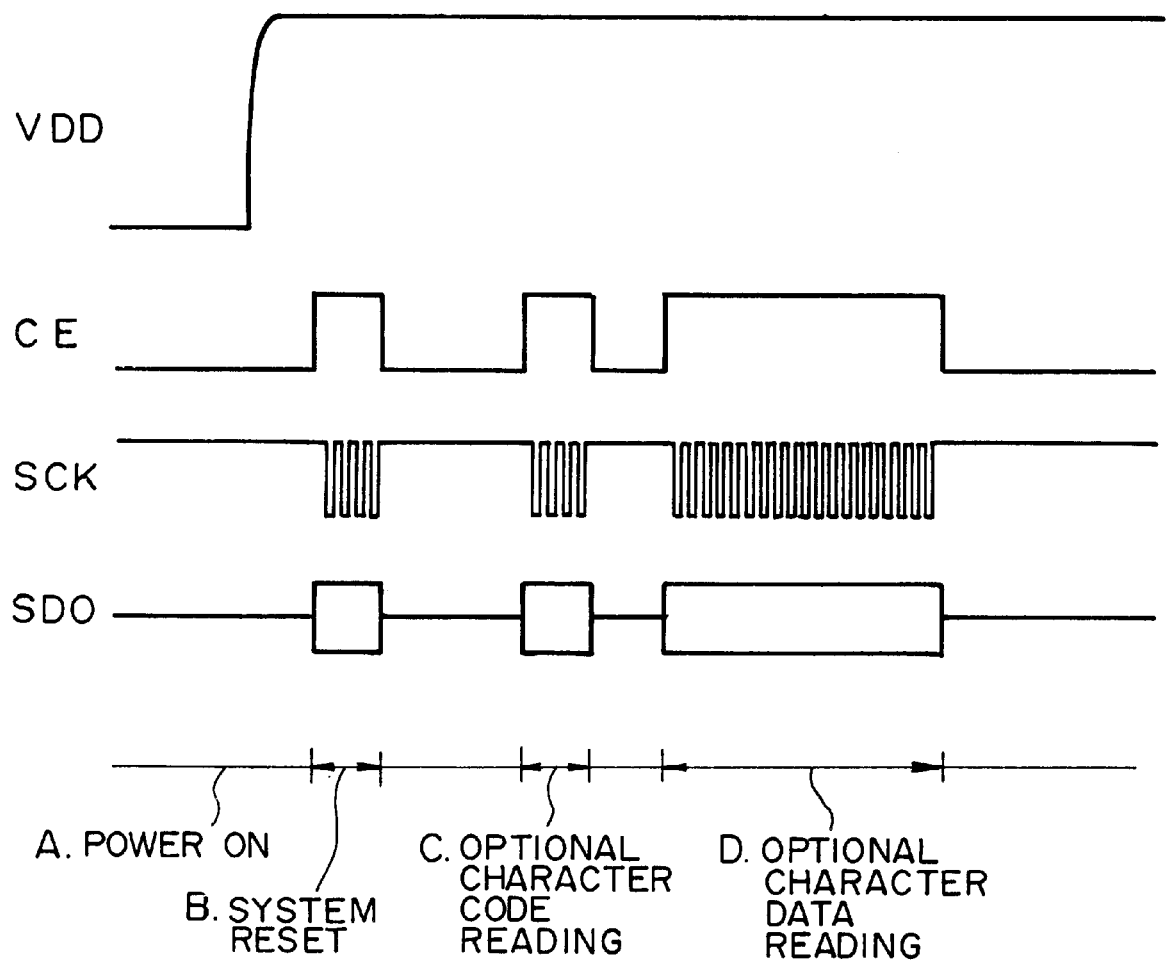
FIG. 22 is a waveform diagram showing the timing of the operation shown in FIG. 21.

FIG. 22 is a waveform diagram showing the timing of the flowchart of FIG. 21.

When the power source is turned on at a point A, a voltage VDD of the imprinting apparatus power supply is increased to a predetermined level. Then, a reset code for system resetting is sent from the unillustrated control circuit in the camera at a point B. The imprinting apparatus is thereby reset to perform the initializing operation. The microprocessor 4 reads the optional character code from the memory means 9 at a point C, and reads out optional character data at a point D.

A timing diagram in the case where only one kind of optional character data is used has been described. If there are two or more kinds of optional character data, optional character control code reading and optional character data reading are performed again after the point D, and this operation is repeated a number of times corresponding to the number of kinds of optional character data.

Figure 23:
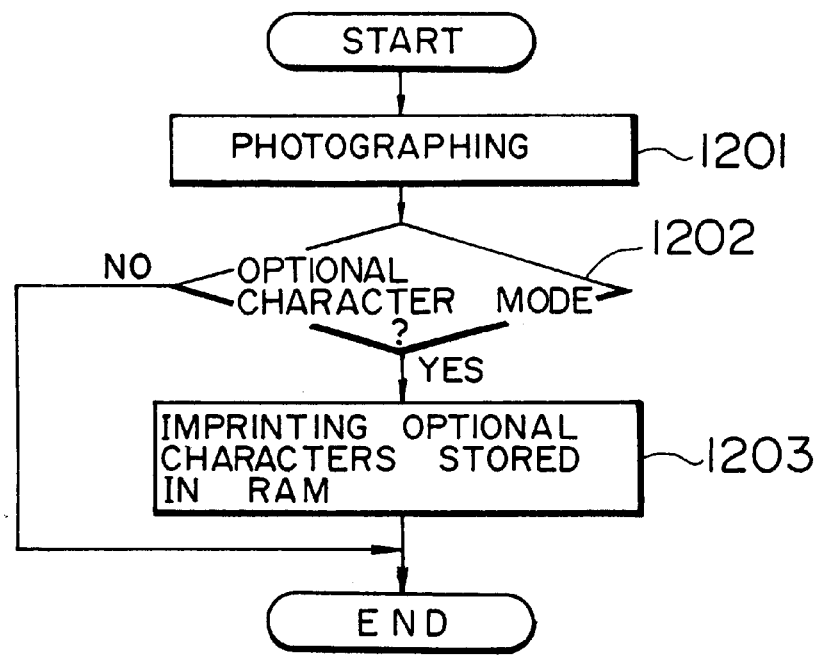
FIG. 23 is a flowchart of an imprinting process of the camera having the imprinting apparatus in accordance with the third embodiment of the invention.

FIG. 23 is a flowchart of a process of actually imprinting optional character data.

When the photographing operation is completed (step 1201), a determination is made as to whether the present mode is the optional character imprinting mode (step 1202). In the case of the optional character imprinting mode, a timing control signal formed in accordance with a character font based on the optional character data stored in the internal RAM of the microprocessor 4 is sent to the imprinting drive means 6, thereby performing imprinting with the LED 7 in a linked relationship with film feeding (step 1203).

Figure 24:
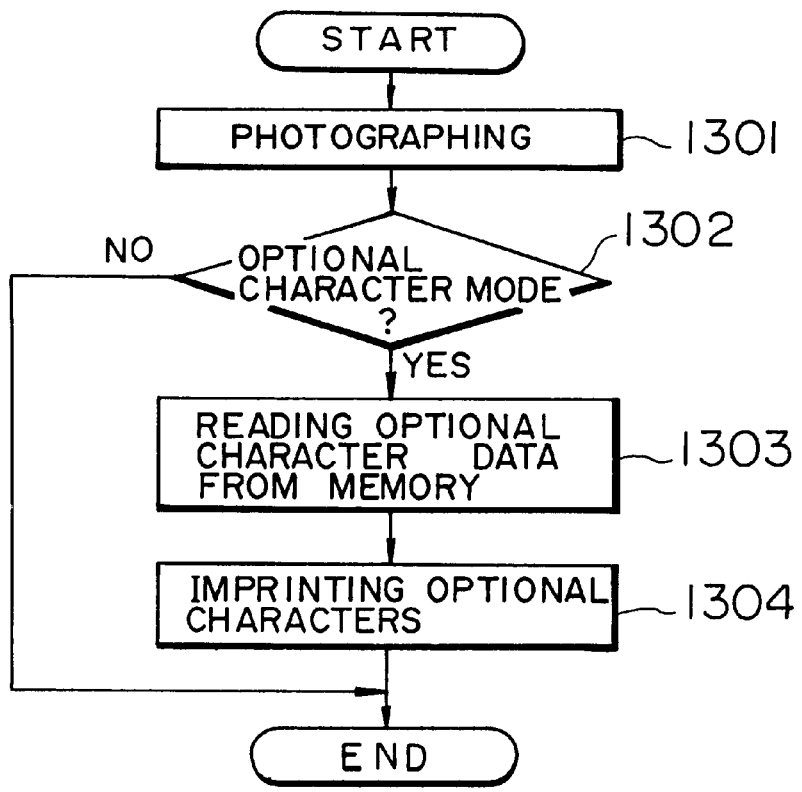
FIG. 24 is a flowchart of another imprinting process of the camera having the imprinting apparatus in accordance with the third embodiment of the invention.

FIG. 24 is a flowchart showing another example of the optional character data imprinting process different from that shown in FIG. 23. This process is based on a method of reading out optional character data from the memory means 9 each time optical character imprinting occurs.

When the photographing operation is completed (step 1301), a determination is made as to whether the present mode is the optional character imprinting mode (step 1302), as in the case of the process shown in FIG. 23. In the case of the optional character imprinting mode, the microprocessor 4 reads optional character data from the memory means 9 (step 1303), and sends a timing control signal formed in accordance with a character font based on this data to the imprinting drive means 6, thereby performing imprinting with the LED 7 in a linked relationship with film feeding (step 1304).

If there are a plurality of kinds of optional characters, numbers are designated for them in the optional character mode, and the optional character data of each designated number is read from the memory means 9.

Figure 25:
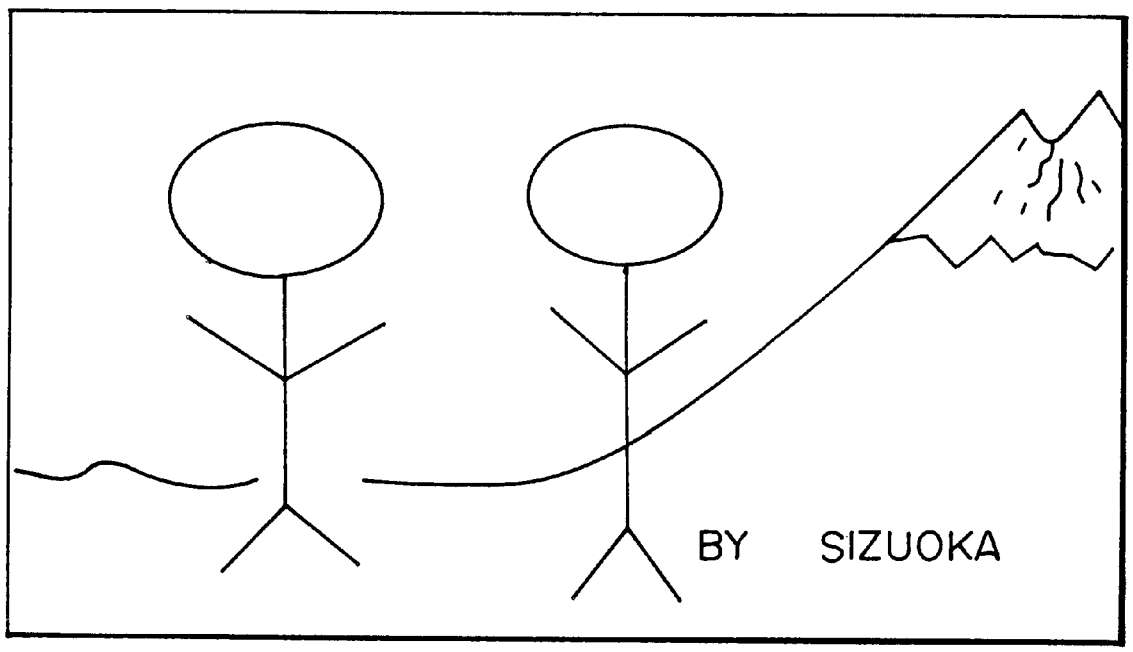
FIG. 25 is an example of a photograph taken by the camera having the imprinting apparatus in accordance with the third embodiment of the invention.

FIG. 25 shows an example of a photograph taken by a process such as that shown in FIG. 23 or 24.

Figure 26:
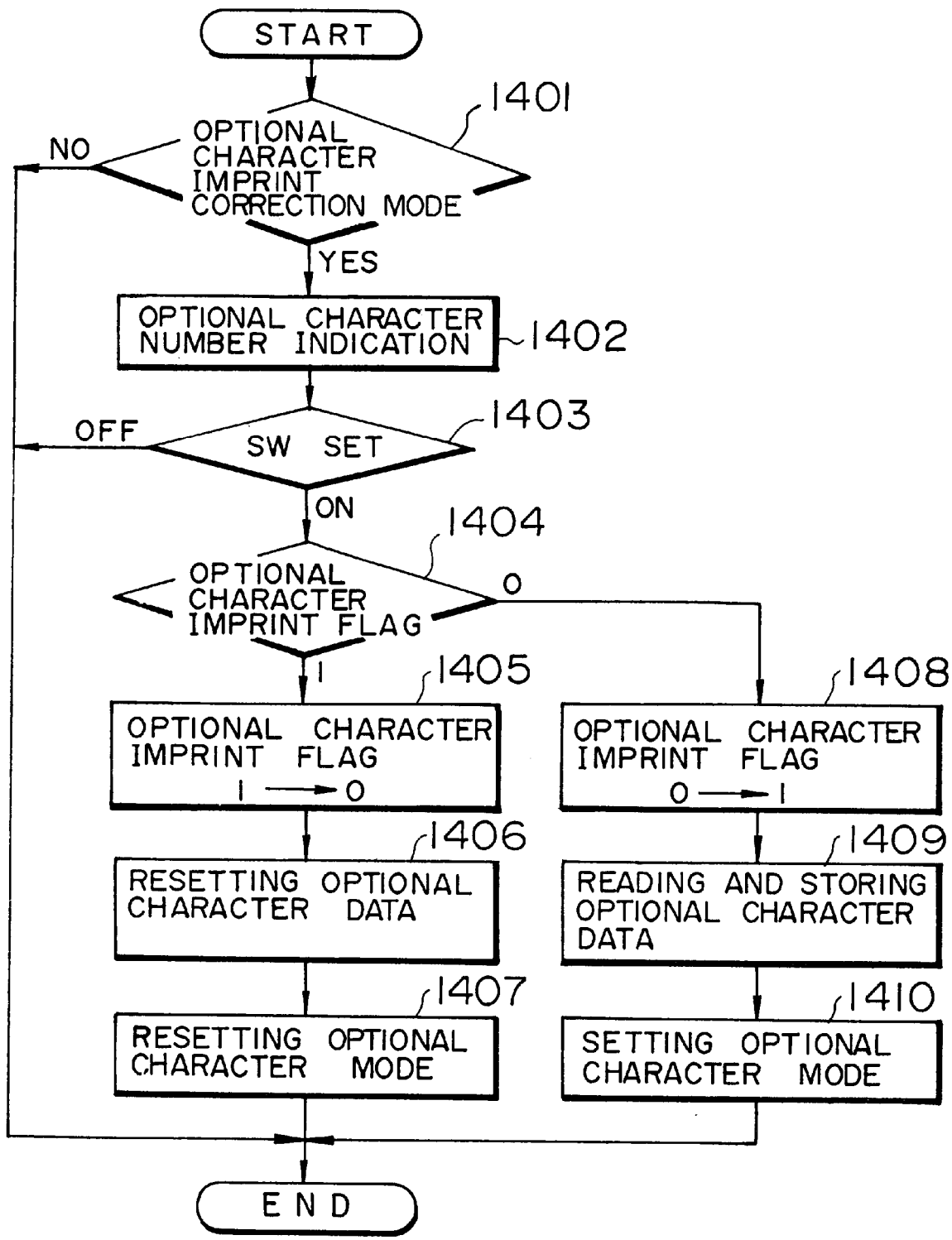
FIG. 26 is a flowchart of an optional character setting/cancelling process including a user operation in accordance with the third embodiment of the invention.

FIG. 26 is a flowchart of a process in which a user of the camera sets the camera state in a simple manner to determine whether the optional characters written in a factory or a service station is used.

It is assumed here that this operation is achieved by using the message switch 1 and the setting switch 10, and that the optional character imprinting mode is selected by pressing the message switch 1 one time, while an optional character imprinting correction mode is selected by pressing the message switch two times in a short duration.

First, a determination is made as to whether the present mode is the optional character imprinting correction mode (step 1401). If the present mode is the optional character imprinting correction mode, the message mode switch 1 is then pressed repeatedly to set the optional character number to a desired number (step 1402). A determination is then made as to whether the setting switch 10 has been turned on by being pressed (step 1403). If the setting switch 10 is on, a determination is made as to use/non-use of optional character data. If the optional character imprinting flag is "1", that is, the apparatus is in the state of using optional character data, the optional character imprinting flag is changed from "1" to "0" to set the apparatus in the non-use state (step 1405). Subsequently, the optional character data in the internal RAM of the microprocessor 4 is reset (step 1406), and the optional character mode of the corresponding number is reset (step 1407). Thereafter, each time the message switch 1 is pressed, an optional character number display is formed, but the reset optional character number is not displayed in this optional character number display.

If the optional character imprinting flag is "0" in step 1404, that is, if the apparatus is in the state of being disabled to use optional characters, the optional character imprinting flag is set from "0" to "1" to set the apparatus in the enabled state (step 1408). Optional character data is then read out of the memory means 9 and stored in the RAM (step 1409), and the optional character mode is set (step 1410). Thereafter, the number thereby set is displayed in the optional character number display.

During the operation of step 1407, "cancelled" is displayed for a certain period of time by the display means 5. Also, during the operation of step 1410, "set" is displayed for a certain period of time by the display means 5.

As shown in FIG. 26, a user of the camera can freely enable or disable the optional character imprinting operation. This effect is convenient in a case where the amount of message and optional character data is excessively increased.

According to the third embodiment, a user can take the camera with a memo or the like showing optional characters that the user wants to set to a service department or the like to have the data on the characters written in the memory means with a special tool. Therefore, there is no possibility that the user will input erroneous data or fail to set optional characters, and a user can operate the imprinting apparatus easily.

Also, it is not necessary for the imprinting apparatus to have its own optional character input/display means. Thus, the need for a large high-cost imprinting apparatus can be eliminated.

Further, the memory means for storing optional character data is arranged so that the data is not erased even when the battery for the imprinting apparatus is changed. It is thereby possible to save a user the time and trouble of taking the camera to a service department or the like to rewrite data to memory at the time of a battery change.

Further, if codes for determining the use/non-use of written optional characters are stored in the memory means, the need for displaying optional characters which are rarely used among many optional characters is eliminated. The apparatus is thereby improved in operability.

In accordance with the above-described embodiments, the language related to imprinted letters or characters is changed by the operation of the selection switch for selecting a changed part of date information after the letter/character imprinting mode has been set, that is, the selection switch has both this selection function and a function of changing language information (for example, from English letters/characters to French letters/characters of the same meaning). The letters/characters are changed, after the letter/character imprinting mode has been selected by an operation of the mode switch for selecting the letter/character imprinting mode, by a further operation of the mode switch, that is, the mode switch has both the imprinting mode selection function and a function of changing letters/characters. Also, imprinting information is changed from letters/characters to date information by the date switch for changing the imprinting arrangement of the date information. The date switch has both this function and the function of changing from letters/characters to date information irrespective of the selected language and letters/characters.

It is therefore possible to imprint letters/characters as words in a selected language as well as date information by a comparatively simple operation.

The imprinting apparatus is also provided with an information setting means for setting letters/characters of a predetermined language as imprinting information after a battery change, and a programmable erasable memory means in which letters/characters of a predetermined language are written as imprinting information. The information setting means may include a means for setting imprinting information written in the programmable erasable memory means after a battery change, a means for setting letters/characters of a language set before a battery change as imprinting information after the battery change, and a means for setting letters/characters of a language set last before a battery change as imprinting information after the battery change. When the operation of changing the battery is completed, the information setting means reads out particular letters/characters of the particular language from the memory means or programmable erasable memory means to automatically set these letters/characters.

The imprinting apparatus is also provided with a display means for displaying printed information. The display means displays, for a predetermined time after a battery change, a language set by the information setting means and imprinting information formed of words in a language designated by this language.

The need for a troublesome user operation of setting letters/characters of the desired language each time the battery is changed can be thereby eliminated, and it is possible to confirm the set letters/characters (imprinting information).

The imprinting apparatus may also be provided with a display means for displaying language information in the form of an abbreviation and for displaying imprinting information in a corresponding language in the form of a symbol. By this display means, imprinting information using letters/characters to express the same meaning is represented by the same symbol no matter what the selected language.

Language information and information designating kinds of letters/characters set by the display means are displayed in the form of an abbreviation and a symbol.

It is thereby possible to reduce the area for displaying each kind of information on imprinting on the display means, and to confirm the content of each displayed information at a glance.

The apparatus is may also be provided with a memory means capable of writing/reading information and capable of maintaining a memory content even when a battery is changed, information reading means for reading, by a predetermined timing, letter/character imprinting information corresponding to an imprinted font previously written in the memory means, imprinting means for imprinting the imprinting information read by the information reading means, and a control means for performing imprinting by controlling the imprinting means. The imprinting information previously stored in the memory means by the predetermined timing may be imprinted on a memory medium.

It is thereby possible to eliminate the possibility of an error in setting imprinted letters/characters or failure to set the desired letters/characters.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data recording apparatus comprising:
   a data recording device;
   a setting portion which sets said data recording device in a time data recording mode for recording time data and in a message data recording mode for recording message data;
   a first designating portion which designates message data to be recorded from among predetermined plural message data in the message data recording mode, in accordance with operation of a first operating member;
   a second designating portion which designates an expression form for message data designated by said first designating portion in accordance with operation of a second operating member different from the first operating member; and
   a control portion which controls said data recording device so that said data recording device records data in accordance with designations made by said first and second designating portions, in the message data recording mode,
   wherein, when said first designating portion designates a predetermined message data and said second designating portion designates a first expression form, and the second operating member is operated for changing the expression form designation while the first operating member maintains a message data designation, said control portion responds to the maintained data designation by said first designation portion and the expression form designation change by said second designation portion to designate a second expression form which is different from the first expression form.

2. An apparatus according to claim 1, wherein said second designating portion includes means for designating a language for expressing the message data.

3. An apparatus according to claim 1, wherein said second designating portion includes means for expressing same meaning data in a plurality of expression forms, and means for selecting a form in which the data is expressed from the plurality of expression forms.

4. An apparatus according to claim 1, wherein said first designating portion includes means for storing a plurality of data having different meanings, and means for selecting data to be recorded by said data recording device from the plurality of data having different meanings.

5. An apparatus according to claim 1, wherein said data recording device comprises means for recording the data on a photographic film.

6. An apparatus according to claim 1, wherein said first designating portion includes means for designating message data to be recorded by said data recording device.

7. An apparatus according to claim 1, wherein said data recording device includes means for recording data designated by said first designating portion, in an expression form designated by said second designating portion.

8. An apparatus according to claim 1, wherein said first designating portion includes means for designating data from a plurality of prestored data, and wherein each of said plurality of prestored data has meaning as a message.

9. An apparatus according to claim 8, wherein said data having meaning as a message consists of plural letters or marks.

10. An apparatus according to claim 1, wherein said data recording device records data on an image recording medium in accordance with the expression form designated by said second designating portion.

11. An apparatus to be adapted to a data recording device which records data on an image recording medium, comprising:
    a setting portion which sets the data recording device in a time data recording mode for recording time data and in a message data recording mode for recording message data;
    a first designating portion that designates message data to be recorded from among predetermined plural message data in the message data mode in accordance with operation of a first operating member;
    a second designating portion that designates an expression form for message data designated by said first designating portion in accordance with operation of a second operating member different from the first operating member; and
    a control portion which controls said data recording device so that said data recording device records data in accordance with designations made by said first designating portion and said second designating portion,
    wherein, when said first designating portion designates a predetermined message data and said second designating portion designates a first expression form, and the second operating member is operated for changing the expression form designation while the first operating member maintains a message data designation, said control portion responds to the maintained data designation by said first designation portion and the expression form designation change by said second designation portion to designate a second expression form which is different from the first expression form.

12. An apparatus according to claim 11, wherein said data recording device includes means for recording data, wherein said means for recording data records data relating to a content of a photograph made by the camera.

13. An apparatus according to claim 12, wherein said data recording device includes means for recording data on a photographic film.

14. An apparatus according to claim 11, wherein said first designating portion includes means for designating data from a plurality of prestored data, and wherein each of said plurality of prestored data has meaning as a message.

15. An apparatus according to claim 14, wherein said data having meaning as a message consists of plural letters or marks.

16. An apparatus according to claim 11, wherein said control portion controls said data recording device so that it records data on an image recording medium in accordance with the expression form designated by said second designating portion.

17. A camera to which a data recording apparatus for recording data is adapted, comprising:
   a data recording device;
   a setting portion which sets said data recording device in a time data recording mode for recording time data and in a message data recording mode for recording message data;
   a first designating portion that designates message data to be recorded from among predetermined plural message data in the message data recording mode in accordance with operation of a first operating member;
   a second designating portion that designates an expression form for message data designated by said first designating portion in accordance with operation of a second operating member different from the first operating member; and
   a control portion which controls said data recording device so that said data recording device records data in accordance with designations made by said first designating portion and said second designating portion in the message data recording mode,
   wherein, when said first designating portion designates a predetermined message data and said second designating portion designates a first expression form, and the second operating member is operated for changing the expression form designation while the first operating member maintains a message data designation, said control portion responds to the maintained data designation by said first designation portion and the expression form designation change by said second designation portion to designate a second expression form which is different from the first expression form.

18. A camera according to claim 17, wherein said data recording device records data relating to a content of a photograph made by the camera.

19. A camera according to claim 18, wherein said data recording device includes means for recording data on an image recording medium.

20. A camera according to claim 19, wherein said data recording device includes means for recording data on a photographic film.

21. A camera according to claim 17, wherein the camera includes said data recording device.

22. An apparatus according to claim 17, wherein said first designating portion includes means for designating data from a plurality of prestored data, and wherein each of said plurality of prestored data has meaning as a message.

23. An apparatus according to claim 22, wherein said data having meaning as a message consists of plural letters or marks.

24. A camera according to claim 17, wherein said data recording device records data on an image recording medium in accordance with the expression form designated by said second designating portion.

25. A data recording apparatus operable in at least a message data recording mode for recording message data on a recording medium and a recording mode which is different from the message data recording mode, said data recording apparatus comprising:
   a data recording device which records data on the image recording medium;
   a mode switching portion, responsive to a predetermined operation of an operating member when said data recording apparatus is in the recording mode different from the message data recording mode, which switches said data recording device from the recording mode different from the message data recording mode to the message data recording mode in response to the predetermined operation of the operating member when said data recording device is in the recording mode different from the message data recording mode; and
   a data switching portion, responsive to the predetermined operation of the operating member when the data recording apparatus is in the message data recording mode, which switches data to be recorded by said data recording device in the message data recording mode in response to the predetermined operation of the operating member when the data recording apparatus is in the message data recording mode.

26. An apparatus according to claim 25, wherein said mode switching portion includes means for switching from the message data recording mode to the recording mode different from the message data recording mode.

27. An apparatus according to claim 25, wherein said mode switching portion includes means for switching a data recording mode from a time information recording mode for recording time data to the message data recording mode.

28. An apparatus according to claim 25, wherein said data switching portion includes means for changing data to be recorded when said data recording device is in the message data recording mode.

29. An apparatus according to claim 28, wherein said data switching portion includes means for changing a message to be recorded having different meanings.

30. An apparatus according to claim 29, wherein said data switching portion includes means for selecting a message from a plurality of prestored messages.

31. An apparatus according to claim 25, wherein said data recording device records data relating to a content of a photograph made by the camera.

32. An apparatus to be adapted to a data recording device operable in at least a message data recording mode for recording message data on a recording medium and a recording mode which is different from the message data recording mode, said apparatus comprising:
   a mode switching portion, responsive to a predetermined operation of an operating member when said data recording apparatus is in the recording mode different from the message data recording mode, which switches said data recording device from the recording mode different from the message data recording mode to the message data recording mode in response to the predetermined operation of the operating member when said data recording device is in the recording mode different from the message data recording mode; and
   a data switching portion, responsive to the predetermined operation of the operating member when the data recording apparatus is in the message data recording mode, which switches data to be recorded by said data recording device in the message data recording mode in response to the predetermined operation of said operating member when the data recording device is in the message data recording mode.

33. An apparatus according to claim 32, wherein said data recording device records data relating to a content of a photograph.

34. An apparatus according to claim 32, wherein said data recording device includes means for recording data on a photographic film.

35. A camera to which a data recording apparatus operable in at least a message data recording mode for recording message data on an image recording medium and a recording mode which is different from the message data recording mode is adapted, said camera comprising:
   a data recording device which records data on the image recording medium;
   a mode switching portion, responsive to a predetermined operation of an operating member when said data recording apparatus is in the recording mode different from the message data recording mode, which switches said data recording apparatus from the recording mode different from the message data recording mode to the message data recording mode in response to the predetermined operation of the operating member when said data recording apparatus is in the recording mode different from the message data recording mode; and
   a data switching portion, responsive to the predetermined operation of the operating member when the data recording apparatus is in the message data recording mode, which switches data to be recorded by said data recording device in the message data recording mode in response to the predetermined operation of the operating member when the data recording apparatus is in the message data recording mode.

36. A camera according to claim 35, wherein said data recording device records data relating to a content of a photograph made by the camera.

37. A camera according to claim 36, wherein said data recording device comprises means for recording the data on an image recording medium.

38. A camera according to claim 36, further comprising:
   first designating means for designating prestored data; and
   second designating means for designating an expression form;
   wherein said data recording device records data in accordance with designations by said first designating means and said second designating means.

39. A camera according to claim 35, wherein the camera comprises the data recording apparatus.

40. A data recording apparatus comprising:
   a data recording device;
   a setting portion which sets said data recording device in a time data recording mode for recording time data and in a message data recording mode for recording message data;
   a first designating portion which designates message data to be recorded from among predetermined plural message data in the message data recording mode in accordance with operation of a first operating member;
   a second designating portion which designates an expression form for message data designated by said first designating portion in accordance with operation of a second operating member which is different from the first operating member, and
   a control portion which controls said recording device so that said data recording device records data in accordance with designations made by said first designating portion and said second designating portion in the message data recording mode,
   wherein, when said first designating portion designates a predetermined message data and said second designating portion designates first expression data, and the first operating member is operated for changing message data while the second operating member maintains an expression form designation, said control portion responds to the maintained expression form designation by said second designating portion and the data designation changed by said first designating portion so as to record second message data different from the first message data.

* * * * *

UNITED STATES PATENT AND TRADEMARK OFFICE
CERTIFICATE OF CORRECTION

PATENT NO. : 5,937,217

DATED : August 10, 1999

INVENTOR(S): MASANORI OHTSUKA, ET AL.

It is certified that error appears in the above-identified patent and that said Letters Patent is hereby corrected as shown below:

<u>TITLE PAGE AT ITEM [56] FOREIGN PATENT DOCUMENTS</u>,
"2127632" should read --2-127632--.

<u>COLUMN 10</u>,
Line 11, "ensures" should read --ensure--.

<u>COLUMN 13</u>,
Line 22, ""1",that" should read --"1," that--.

<u>COLUMN 15</u>,
Line 5, "is" should be deleted.

Signed and Sealed this

Second Day of May, 2000

Attest:

Q. TODD DICKINSON

*Attesting Officer*  *Director of Patents and Trademarks*